US009577480B2

(12) United States Patent
Yamada et al.

(10) Patent No.: US 9,577,480 B2
(45) Date of Patent: Feb. 21, 2017

(54) ROTOR FOR ROTARY ELECTRIC MACHINE

(71) Applicants: Eiji Yamada, Owariasahi (JP); Ryoji Mizutani, Nagoya (JP); Shintaro Chinen, Toyota (JP); Kenji Hiramoto, Owariasahi (JP); Hideo Nakai, Nisshin (JP)

(72) Inventors: Eiji Yamada, Owariasahi (JP); Ryoji Mizutani, Nagoya (JP); Shintaro Chinen, Toyota (JP); Kenji Hiramoto, Owariasahi (JP); Hideo Nakai, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 582 days.

(21) Appl. No.: 13/687,934

(22) Filed: Nov. 28, 2012

(65) Prior Publication Data

US 2013/0134823 A1      May 30, 2013

(30) Foreign Application Priority Data

Nov. 29, 2011   (JP) ................................ 2011-260447

(51) Int. Cl.
| | |
|---|---|
| *H02K 1/24* | (2006.01) |
| *H02K 17/26* | (2006.01) |
| *H02K 19/12* | (2006.01) |
| *H02K 1/28* | (2006.01) |

(52) U.S. Cl.
CPC ............... *H02K 1/24* (2013.01); *H02K 17/26* (2013.01); *H02K 19/12* (2013.01); *H02K 1/28* (2013.01)

(58) Field of Classification Search
CPC  H02K 1/24; H02K 1/28; H02K 17/26; H02K 19/12
USPC .... 310/216.004, 216.016, 216.053, 216.099, 310/216.102, 216.103, 269, 49.15, 186
IPC ......................................................... H02K 1/24
See application file for complete search history.

(56) References Cited

U.S. PATENT DOCUMENTS

| | | | | |
|---|---|---|---|---|
| 3,147,393 | A * | 9/1964 | Iwai ....................... | H02K 1/185 310/216.079 |
| 4,591,766 | A * | 5/1986 | Takaba ................... | H02K 29/12 310/216.095 |
| 4,616,151 | A * | 10/1986 | Pryjmak ................ | 310/216.012 |
| 4,827,172 | A * | 5/1989 | Kobayashi ............. | F02N 11/00 174/DIG. 21 |
| 4,935,653 | A * | 6/1990 | Cheng .................... | H02K 1/165 310/184 |
| 6,888,283 | B2 * | 5/2005 | Yonekura ............... | 310/216.011 |
| 7,414,348 | B2 * | 8/2008 | Yamamoto et al. ......... | 310/269 |

(Continued)

FOREIGN PATENT DOCUMENTS

| | | |
|---|---|---|
| JP | 03-173328 A | 7/1991 |
| JP | 2007-202292 A | 8/2007 |

(Continued)

*Primary Examiner* — John K Kim
(74) *Attorney, Agent, or Firm* — Dinsmore & Shohl LLP

(57) ABSTRACT

A rotor includes a plurality of salient poles, each of which is formed by a plurality of plate members including steel plates that are stacked together, provided extending in a radial direction and around which a coil is wound. The plurality of salient poles has auxiliary salient poles that protrude from the salient poles between two salient poles that are adjacent to one another. The auxiliary salient poles are formed by only a first plate member that is a portion of plate members that forms the salient poles.

12 Claims, 22 Drawing Sheets

(56) References Cited

U.S. PATENT DOCUMENTS

| | | | |
|---|---|---|---|
| 7,859,162 B2* | 12/2010 | Yamamoto | H02K 1/148 310/214 |
| 8,013,491 B2* | 9/2011 | Krauth | H02K 1/165 310/184 |
| 8,108,983 B2* | 2/2012 | Yamamoto et al. | 29/596 |
| 8,350,437 B2* | 1/2013 | Doushita | H02K 1/146 310/198 |
| 9,124,159 B2* | 9/2015 | Yamada | H02K 1/24 |
| 2004/0046479 A1* | 3/2004 | Haga | H02K 1/24 310/269 |
| 2004/0070304 A1* | 4/2004 | Enomoto | H02K 15/022 310/216.088 |
| 2006/0163965 A1* | 7/2006 | Chen | H02K 1/146 310/186 |
| 2007/0035199 A1* | 2/2007 | Yamamoto | H02K 1/148 310/269 |
| 2010/0259136 A1 | 10/2010 | Hiramoto et al. | |
| 2011/0050025 A1* | 3/2011 | Doushita | H02K 1/146 310/198 |
| 2011/0204744 A1* | 8/2011 | Tsuna | H02K 1/24 310/216.066 |
| 2013/0134823 A1* | 5/2013 | Yamada et al. | 310/216.004 |

FOREIGN PATENT DOCUMENTS

| | | |
|---|---|---|
| JP | 2009-112091 A | 5/2009 |
| JP | 2012-222940 A | 11/2012 |
| JP | 2012-222941 A | 11/2012 |

\* cited by examiner

F I G . 24
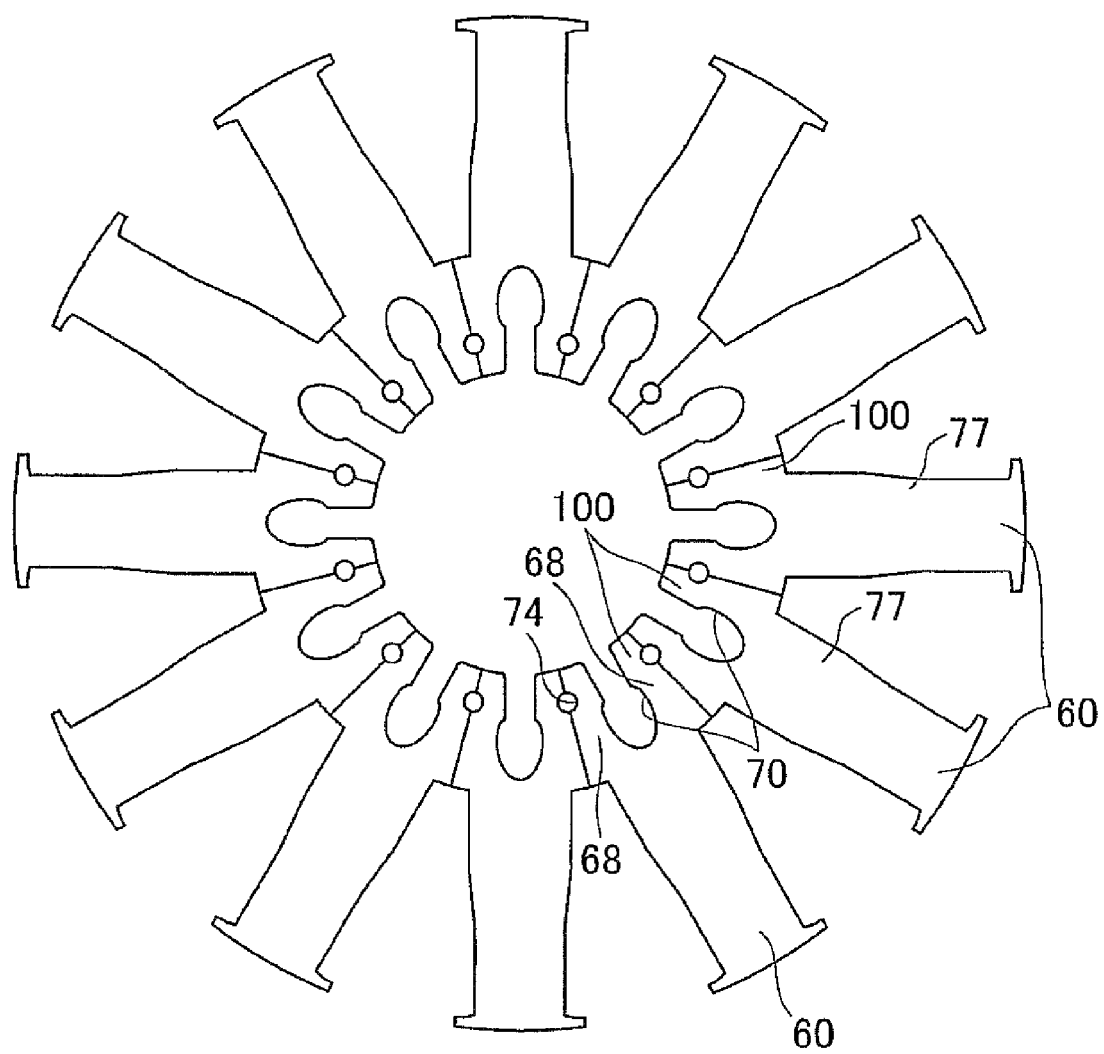

ROTOR FOR ROTARY ELECTRIC MACHINE

INCORPORATION BY REFERENCE

The disclosure of Japanese Patent Application No 2011-260447 filed on Nov. 29, 2011 including the specification, drawings and abstract is incorporated herein by reference in its entirety.

BACKGROUND OF THE INVENTION

1. Field of the Invention

The invention relates to a rotor for a rotary electric machine, that is provided with a plurality of teeth, each of which formed by a plurality of plate members including steel plates that are stacked together, around which a rotor coil is wound.

2. Description of the Related Art

Japanese Patent Application Publication No. 2009-112091 describes a rotary electric machine in which a stator and, a rotor are arranged opposing one another, and that includes salient poles provided in a plurality of locations in the circumferential direction of the rotor, rotor coils that are wound around the salient poles and separated from each other, and a diode connected to each rotor coil. The diodes rectify current that flows to the rotor coils, such that the magnetization direction is reversed with salient poles that are adjacent to one another in the circumferential direction of the rotor. Also, the Stator has teeth provided in a plurality of locations in the circumferential direction of a stator core. Stator windings of a plurality of phases are wound in concentrated windings around the teeth of the stators. A rotating magnetic field that rotates in the circumferential direction generated in the stator by passing alternating current of a plurality of phases through the stator windings of the plurality of phases. Also, an induction current is generated in the rotor coils by a spatial harmonic that is a harmonic component in magnetomotive force distribution in the stator, thus creating N-poles and S-poles alternately at the salient poles in the circumferential direction of the rotor, and generating torque in the rotor. At this time, the salient poles are magnetized, thus creating magnets in which the magnetic poles are fixed, by current that has been rectified by the diodes flowing through the rotor coils.

With this kind of rotary electric machine, the salient poles interact with the rotating magnetic field of the stator and as a result, torque is applied to the rotor. Also, the torque that is applied to the rotor is able to be efficiently increased using the harmonic component of the magnetic field created by the stator.

With this kind of rotary electric machine, there is room for improvement as far as increasing the induction current generated in the rotor coils is concerned.

SUMMARY OF THE INVENTION

The invention thus provides a rotor for a rotary electric machine, that increases the induction current generated in the rotor coils by interlinking most of the magnetic flux generated in the stator to the rotor coils.

A first aspect of the invention relates to a rotor for a rotary electric machine, that includes a plurality of teeth, each of which is formed by a plurality of plate members including steel plates that are stacked together, and around which a rotor coil is wound, the plurality of teeth extending in a radial direction, at least a portion of the plurality of teeth including a magnetic flux inducing section, the magnetic flux inducing section protruding between two of the teeth that are adjacent to one another, from at least a portion of a plurality of plate members that form at least one of the two teeth that are adjacent to one another, and the magnetic flux inducing section being formed by the plate members.

Also, in the rotor according to the first aspect of the invention, the magnetic flux inducing section may be a plurality of magnetic flux inducing portions that protrude between the two teeth that are adjacent to one another, from a plurality of locations in an axial direction of the at least one of the teeth, and that are arranged with a gap in the axial direction one another.

Also in the rotor described above, the plurality of magnetic flux inducing portions may include a plurality of one-side magnetic flux inducing portions that protrude from a plurality of locations in the axial direction of one of the two teeth that are adjacent to one another, and a plurality of other-side magnetic flux inducing portions that protrude from a plurality of locations in the axial direction of the other of the two teeth that are adjacent to one another. Also, the one-side magnetic flux inducing portions and the other-side magnetic flux inducing portions may each be arranged alternately one by one in the axial direction.

Also, in the rotor described above, the one-side magnetic flux inducing portions and the other-side magnetic flux inducing portions may be arranged alternately via a gap in the axial direction.

Also in the rotor described above, the one-side magnetic flux inducing portions and the other-side magnetic flux inducing portions may be fixed together directly, or indirectly via a connecting pin, and at least a portion of the rotor coil that is wound around the teeth having the one-side magnetic flux inducing portions may be arranged radially inward of the one-side magnetic flux inducing portions.

Also in the rotor described above, the one-side magnetic flux inducing portions and the other-side magnetic flux inducing portions may be stacked together alternately in the axial direction.

Also, in the rotor described above, the one-side magnetic flux inducing portions and the other-side magnetic flux inducing portions may be connected together via a connecting pin.

Also, in the rotor described above, the plurality of plate members may include a two-armed steel plate that has a first trunk portion and a protruding portion that protrudes from both sides in a width direction of the first trunk portion, and an armless steal plate that has a second trunk portion. Also, the teeth having the magnetic flux inducing section may be formed by a stacked body that includes the two-armed steel plate and the armless steel plate, and the protruding portions of the two-armed steel plate may form the magnetic flux inducing section.

Also, in the rotor described above, the plurality of plate members may include a one-armed steel plate that has a first trunk portion and a protruding portion that protrudes from one side in a width direction of the first blink portion, and an armless steel plate that has a second trunk portion. Also, the teeth having the magnetic flux inducing section may be formed by a stacked body that includes the one-armed steel plate and the armless steel plate, and the protruding portion of the one-armed steel plate may form the magnetic flux inducing section.

Also, in the rotor according to the first aspect, the magnetic flux inducing section may be formed by magnetic flux inducing plate portions being stacked together, the magnetic flux inducing plate portions may be provided on a portion of the plurality of plate members that form the corresponding teeth.

A second aspect of the invention relates to a rotor for a rotary electric machine, that includes a plurality of teeth, each of which is formed by a plurality of plate members including steel plates that are stacked together, and around which a rotor coil is wound, the plurality of teeth extending in a radial direction, at least a portion of the plurality of teeth including i) a one-side magnetic flux inducing portion that is positioned between two of the teeth that are adjacent to one another, and that protrudes from at least one of the two teeth that are adjacent to one another, and that is formed on at least a portion of a plurality of plate members that form one of the teeth, and ii) an other-side magnetic flux inducing portion that is positioned between the two teeth that are adjacent to one another, and that protrudes from the other of the two teeth that are adjacent to one another, and that is formed on at least a portion of a plurality of plate members that form the other of the teeth; the one-side magnetic flux inducing portion being formed by a stacked portion of a plurality of first magnetic flux inductive plate portions that protrude from the portion of plate members that forms a plurality of locations in an axial direction of one of the teeth, and a second magnetic flux inductive plate portion that is shorter than the first magnetic flux inductive plate portion and that protrudes from another of the plate members that forms a plurality of locations in the axial direction of one, of the teeth; the other-side magnetic flux inducing portion being formed by a stacked portion of a plurality of third magnetic flux inductive plate portions that protrude from a portion of plate members that forms a plurality of locations in the axial direction of the other of the teeth, and a fourth magnetic flux inductive plate portion that is shorter than the third magnetic flux inductive plate portion and that protrudes from another of the plate members that forms a plurality of locations in the axial direction of the other of the teeth; and the first magnetic flux inductive plate portions and the third magnetic flux inductive plate portions being arranged offset in the axial direction and facing one another.

According to the rotor for a rotary electric machine of the invention the induction current generated in the rotor coils is able to be increased by interlinking most of the magnetic flux generated in the stator to the rotor coils.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 11 is viewed from top to bottom;

FIG. 24 is a view of a plurality of second plate members that form an axial portion of the rotor core in FIG. 22.

DETAILED DESCRIPTION OF EMBODIMENTS

First Example Embodiment

Hereinafter, example embodiments of the invention will be described with reference to the accompanying drawings.

Figure 1:
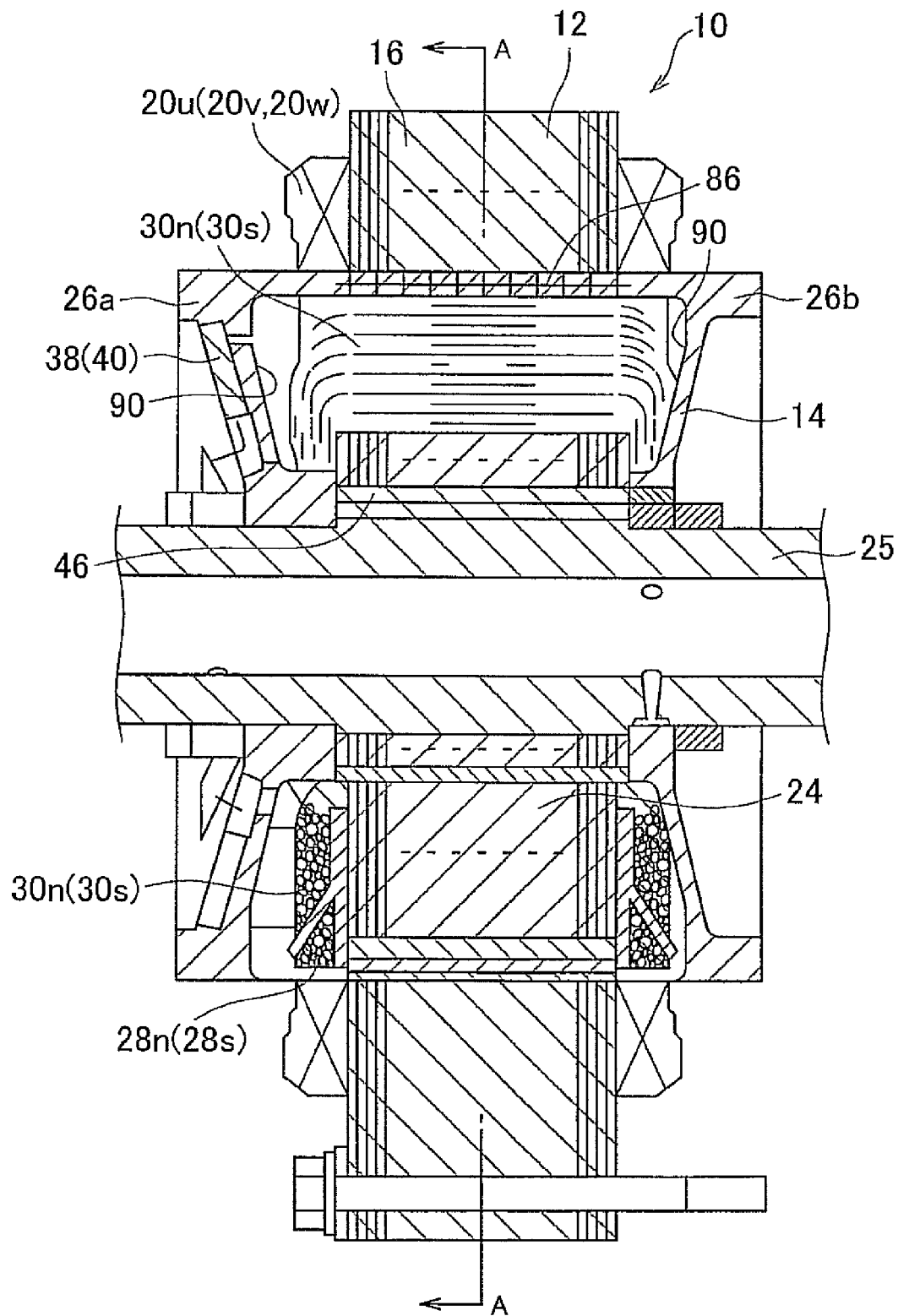
FIG. 1 is a sectional view of a portion of a rotary electric machine that includes a rotor for a rotary electric machine according to a first example embodiment or the invention.

FIGS. 1 to 17 are views of a first example embodiment of the invention. FIG. 1 is a sectional view schematically showing a portion of a rotary electric machine that includes a rotor for a rotary electric machine according to this example embodiment. As shown in FIG. 1, a rotary electric machine 10 functions as either an electric motor or a generator, and includes a stator 12 that is fixed to a casing, not shown, and a rotor for a rotary electric machine (hereinafter simply referred to as "rotor") 14 that is arranged radially inward of the stator 12, and opposing the stator 12 with a predetermined gap therebetween, and that is able to rotate with respect to the stator 12. Unless otherwise specified, the radial direction will refer to a radial direction (radiation direction) orthogonal to the central axis of rotation of the rotor. Also, unless otherwise specified, the circumferential direction will refer to a direction along a circle drawn centered around the central axis of rotation of the rotor. Also, unless otherwise specified, the axial director will refer to an axial direction of the rotor.

The stator 12 includes a stator core 16 made of magnetic material, and stator coils 20$u$, 20$v$, and 20$w$ of a plurality of phases (for example, three phases, i.e., a U-phase, a V-phase, and a W-phase) that are arranged on the stator core 16. The rotor 14 includes a rotor core 24 formed by a plurality of plate members, a shaft 25 that is inserted into and fixedly fitted to a center portion of the rotor core 24, and two end plates 26$a$ and 26$b$ arranged one on each side in the axial direction of the rotor core 24. Also, the rotor 14 includes an N-pole induction coil 28$n$, an S-pole induction coil 28$s$, an N-pole common coil 30$n$, and an S-pole common coil 30$s$ that are an example of a plurality of coils arranged on the rotor core 24, as well as a first diode 38 that is connected to the N-pole induction coil 28$n$, and a second diode 40 that is connected to the S-pole induction coil 28$s$.

Figure 2:
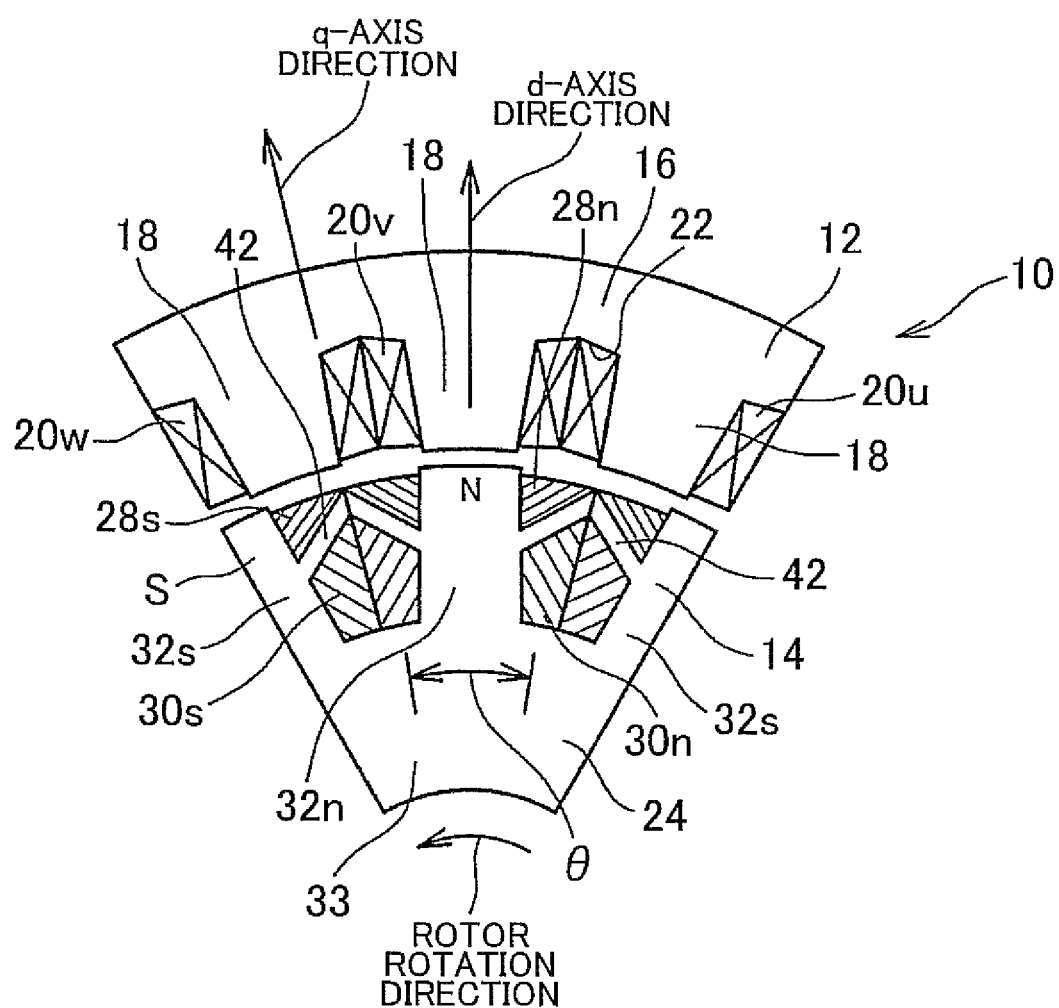
FIG. 2 is sectional view schematically showing a circumferential portion of a rotor and a stator, in the rotary electric machine that includes the rotor according to the first example embodiment.
Figure 3:
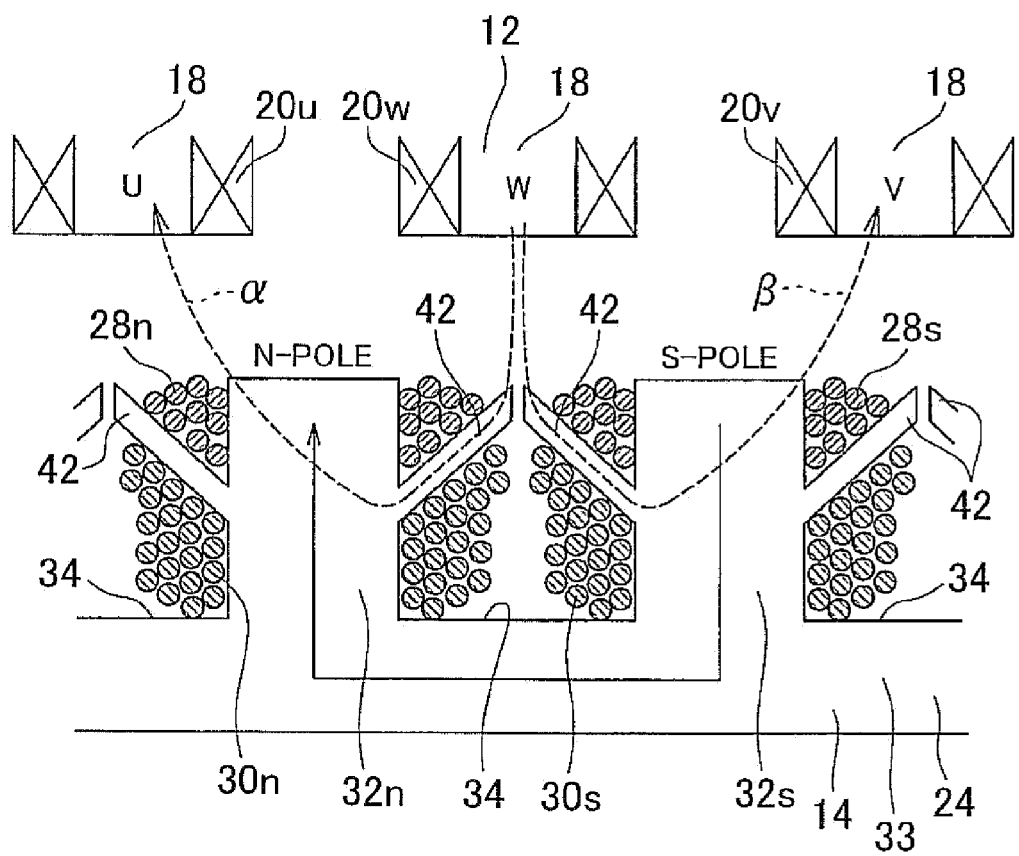
FIG. 3 is a view showing a frame format of the manner in which magnetic flux that is generated by induction current flowing through rotor coils flows through the rotor, in the rotary electric machine that includes the rotor according to the first example embodiment.
Figure 4:
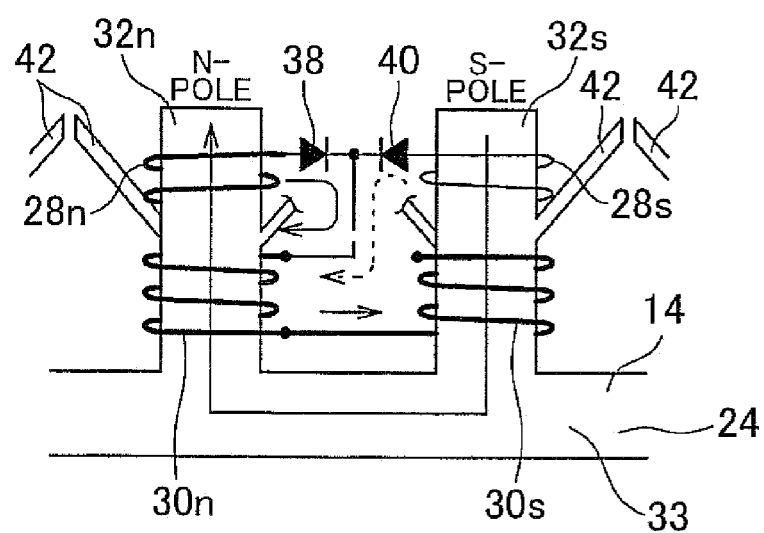
FIG. 4 is a view corresponding to FIG. 3, of diodes connected to the rotor coils.

First, the basic structure of the rotary electric machine 10 will be described with reference to FIGS. 2 to 5. Then the structure of the rotor 14 will be described in detail. FIG. 2 is a sectional view schematically showing a circumferential portion of the rotor and the stator., in the rotary electric machine that includes the rotor of this example embodiment. FIG. 3 is a view showing a frame format of the manner in which magnetic flux that is generated by induction current flowing through rotor coils flows through the rotor, in the rotary electric machine that includes the rotor of this example embodiment. FIG. 4 is a view corresponding to FIG. 3, of the diodes that are connected to the rotor coils.

As shown in FIG. 2, the stator 12 includes the stator core 16. A plurality of teeth 18 that protrude radially inward (i.e., toward the rotor 14) are arranged in a plurality of locations in the circumferential direction on an inner peripheral surface of the stator core 16, and slots 22 are formed between these teeth 18. The stator core 16 is formed by magnetic material such as stacked bodies of metal plates such as magnetic steel plates, e.g., silicon steel plates. The plurality of teeth 18 are arranged at intervals in the circumferential direction around the central axis of rotation that is the rotation axis of the rotor 14.

The stator coils 20$u$, 20$v$, and 20$w$ of the phases are wound in short pitch concentrated windings through the slots 22 and around the teeth 18 of the stator core 16. Magnetic poles are formed by the stator coils 20$u$, 20$v$, and 20$w$ being wound around the teeth 18 in this way. Also, the teeth 18 that are aligned in the circumferential direction are able to be magnetized by passing alternating current of the plurality of phases through the stator coils 20$u$, 20$v$ and 20$w$ of the plurality of phases. As a result, a rotating magnetic field that rotates in the circumferential direction is able to be created in the stator 12. The stator coils 20$u$, 20$v$, and 20$w$ are not limited to a structure in which they are wound around the teeth 18 of the stator 12 in this way. For example, the stator coils 20$u$, 20$v$, and 20$w$ may also be toroidal windings in which stator coils of a plurality of phases are wound around a plurality of locations in the circumferential direction of an annular portion of the stator core 16 that is away from the teeth 18. This structure also enables a rotating magnetic field to be created in the stator 12.

The rotating magnetic field created in the teeth 18 acts on the rotor 14 from the tip end surfaces of the teeth 18. In the example shown in FIG. 2, one pair of poles is formed by three teeth 18 around which the stator coils 20$u$, 20$v$, and 20$w$ of the three phases (i.e., the U-phase, the V-phase, and the W-phase) are wound, respectively.

Meanwhile, the rotor 14 includes the rotor core 24 formed by a plurality of plate members that are steel plates such as magnetic steel plates of magnetic material, and a plurality of rotor coils, i.e., the N-pole induction coil 28$n$, the N-pole common coil 30$n$, the S-pole induction coil 28$s$, and the S-pole common coil 30$s$. The rotor core 24 has N-pole forming salient poles 32$n$ and S-pole forming salient poles 32$s$ that are a plurality of magnetic pole portions provided protruding radially outward (i.e., toward the stator 12) in a plurality or locations in the circumferential direction on the outer peripheral surface, are main salient poles, and are second teeth. The N-pole forming salient poles 32$n$ and the S-pole forming salient poles 32$s$ are arranged alternately and at intervals in the circumferential direction of the rotor core 24. The salient poles 32$n$ and 32$s$ oppose (i.e., face) the stator 12. A rotor yoke 33 that is an annular portion of the rotor core 24, and the plurality of salient poles 32$n$ and 32$s$, are integrally provided by circularly connecting a plurality of rotor core elements that are stacked bodies in which a plurality of plate members that are steel plates are stacked together. This will be described in detail later. The N-pole forming salient poles 32$n$ and the S-pole forming salient poles 32$s$ are the same size and shape.

More specifically, the N-pole common coil 30$n$ and the N-pole induction coil 28$n$ that are the two N-pole rotor coils are wound in concentrated windings around every other N-pole forming salient pole 32$n$ in the circumferential direction of the rotor 14. Also, in the rotor 14, the S-pole common coil 30$s$ and the S-pole induction coil 28$s$ that are the two S-pole rotor coils are wound in concentrated windings around every other S-pole forming salient pole 32$s$, that are other salient poles adjacent to the N-pole forming salient poles 32$n$, in the circumferential direction of the rotor 14.

The rotor 14 has slots 34 (FIG. 3) formed between the salient poles 32$n$ and 32$s$ that are adjacent in the circumferential direction. That is, a plurality of slots 34 are formed at intervals in the circumferential direction around a rotating shaft, a rotation axis, of the rotor 14. Also, the rotor core 24 is fixedly fitted to the radial outside of a shaft 25 (FIG. 1) that is the rotating shaft.

Each N-pole induction coil 28$n$ is wound closer to the tip end side of each N-pole forming salient pole 32$n$, i.e., on the side nearer the stator 12, than the N-pole common coil 30$n$ is. Each S-pole induction coil 28$s$ is wound closer to the tip end side of each S-pole forming salient pole 32$s$, i.e., on the side nearer the stator 12, than the S-pole common coil 30$s$ is. As shown in FIG. 3, the induction coils 28$n$ and 28$s$ and the common coils 30$n$ and 30$s$ that are wound around the salient poles 32$n$ and 32$s$ may be such that a solenoid provided in the length direction the vertical direction of FIG. 3) around each salient pole 32$n$ (or 32$s$) is arranged in a normal winding of a plurality of aligned layers, in the circumferential direction (i.e., the left-right direction in FIG. 3) of the salient pole 32n (or 32s). The induction coils 28n and 28s that are wound around the tip end sides of the salient poles 32n and 32s may also be wound in a spiral shape a plurality of times, i.e., a plurality of turns, around the salient poles 32n and 32s.

Figure 5:
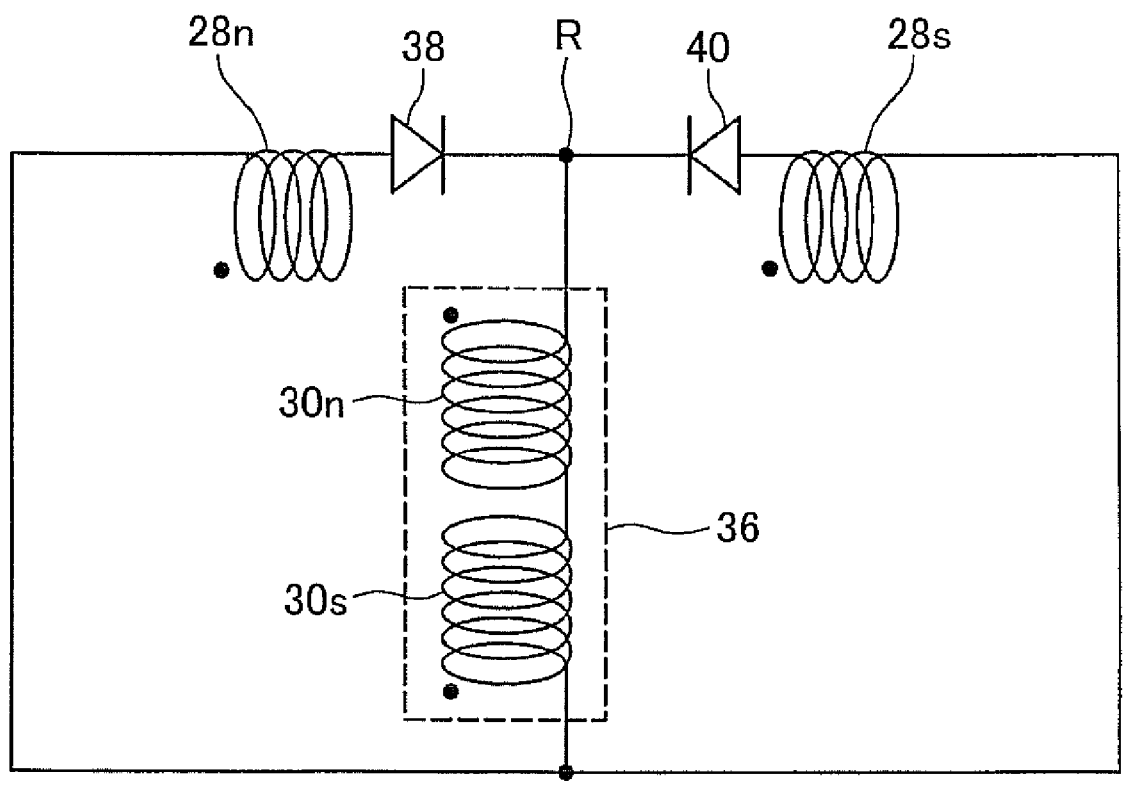
FIG. 5 is a view of an equivalent circuit of a connection circuit of a plurality of coils wound around two salient poles that are adjacent to one another in the circumferential direction of the rotor, in the first example embodiment.

As shown in FIGS. 4 and 5, with two of the salient poles 32n and 32s that are adjacent in the circumferential direction of the rotor 14 as one set, one end of the N-pole induction coil 28n that is wound around one N-pole forming salient pole 32n in each set is connected to one end of the S-pole induction coil 28s that is wound around another S-pole forming salient pole 32s, via the first diode 38 and the second diode 40 that are two magnetic property adjusting portions, i.e., rectifying elements. That is FIG. 5 is a view of an equivalent circuit of a connection circuit of the plurality of coils 28n, 28s, 30n, and 30s that are wound around two salient poles 32n and 32s (FIG. 2) that are adjacent in the circumferential direction of the rotor 14. As shown in FIG. 5, one end of the N-pole induction coil 28n and one end of the S-pole induction coil 28s are connected together at a connection point R via the first diode 38 and the second diode 40 where the forward direction of each reverses.

As shown in FIGS. 4 and 5, one end of the N-pole common coil 30n that is wound around the N-pole forming salient pole 32n in each set is connected to one end of the S-pole common coil 305 that is wound around the S-pole forming salient pole 32s. A common coil set 36 is formed by the N-pole common coil 30n and the S-pole common coil 30s being connected together in series. Furthermore, the other end of the N-pole common coil 30n is connected to the connection point R, and the other end of the S-pole common coil 30s is connected to the other ends of the N-pole induction coil 28n and the S-pole induction coil 28s on the side opposite the connection point R. Also the central axes of the windings of the induction coils 28n and 28s and the common coils 30n and 30s are aligned with the radial direction of the rotor 14 (FIG. 2). The induction coils 28n and 28s and the common coils 30n and 30s may also be wound around a corresponding salient pole 32n (or 32s) via an insulator, not shown, that has an electrical insulation property and is made of resin or the like.

With this kind of structure, as will be described later, the salient poles 32n and 32s are magnetized by rectified current flowing through the N-pole induction coil 28n, the S-pole induction coil 28s, the N-pole common coil 30n, and the S-pole common coil 30s, and thus serve as magnetic pole portions, as will be described later. Returning to FIG. 3, the stator 12 creates a rotating magnetic field by passing alternating current through the stator coils 20u, 20v, and 20w. This rotating magnetic field is not only a magnetic field of a fundamental component (fundamental wave), but includes a magnetic field of a harmonic component (higher harmonic wave) of an order higher than a fundamental wave.

More specifically, the distribution of magnetomotive force that generates the rotating magnetic field in the stator 12 is not a sinusoidal distribution (of only a fundamental wave), but includes a harmonic component, due to the arrangement of the stator coils 20u, 20v, and 20w of the phases, and the shapes of the stator core 16 from the teeth 18 and the slats 22 (sec FIG. 2). In particular, in concentrated windings, the stator coils 20u, 20v, and 20w of the phases do not overlap with each other, so the amplitude level of the harmonic component in the magnetomotive force distribution of the stator 12 increases. For example, when the stator coils 20u, 20v, and 20w are three-phase concentrated windings, the harmonic component is a temporal third-order component of an input, electrical frequency, and the amplitude level of a spatial second-order component increases. In this way, the harmonic component produced in the magnetomotive force due to the arrangement of the stator coils 20u, 20v, and 20w and the shape of the stator core 16 is referred to as a spatial harmonic (space harmonics).

When the rotating magnetic field that includes this spatial harmonic component is applied from the stator 12 to the rotor 14 magnetic-flux fluctuation of the spatial harmonic causes a fluctuation in leakage flux that leaks out into the space between the salient poles 32n and 32s of the rotor 14, and as a result, induced electromotive force is generated in at least one of the induction coils 28n and 28s shown in FIG. 3. Also, the induction coils 28u and 28s on the tip end side of the salient poles 32n and 32s that are close to the stator 12 serve mainly to generate induction current, while the common coils 30n and 30s that are far from the stator 12 serve mainly to magnetize the salient poles 32n and 32s, i.e., serve mainly as electromagnets. Also, as can be understood from the equivalent circuit in FIG. 5, the total current that flows through the induction coils 28n and 28s that are wound around adjacent salient poles 32n and 32s (FIGS. 2 to 4) becomes the current that flows through the common coils 30n and 30s. Adjacent common coils 30n and 30s are connected together in series, so the same effect that is obtained by increasing the number of windings with both can be obtained. Also, the current that flows through the common coils 30n and 30s can be reduced while the magnetic flux that flows through the salient poles 32n and 32s remains the same.

When induction electromotive force is generated in the induction coils 28n and 28s, direct current according to the rectifying direction of the diodes 38 and 40 flows through the N-pole induction coil 28n, the S-pole induction coil 28s, the N-pole common coil 30n, and the S-pole common coil 30s, thereby magnetizing the salient poles 32n and 32s around which the common coils 30n and 30s are wound. As a result, these salient poles 32n and 32s serve as magnetic pole portions that are magnets in which the magnetic poles are fixed. The winding directions of the N-pole induction coil 28n and the N-pole comment coil 30n, and the S-pole induction coil 28s and the S-pole common coil 30s, that are adjacent in the circumferential direction, shown in FIG. 4, are reversed, and thus the magnetization direction in the salient poles 32n and 32s that are adjacent in the circumferential direction is reversed. In the illustrated example, an N-pole is created at the tip end a the salient pole 32n around which the N-pole induction coil 28n and the N-pole common coil 30n are wound, and an S-pole is created at the tip end of the salient pole 32s around which the S-pole induction coil 28s and the S-pole common coil 30s are wound. Therefore, N-poles and S-poles are arranged alternately in the circumferential direction of the rotor 14. That is, the rotor 14 is configured such that N-poles and S-poles are alternately formed in the circumferential direction, by harmonic components that are included in the magnetic field generated in the stator 12 being interlinked. Also, the diodes 38 and 40 that are a plurality of rectifying portions are connected to the rotor coils, and alternately change the direction of magnetomotive force that is generated by the induction current and produced in the plurality of salient poles 32n and 32s, in the circumferential direction of the rotor 14.

Also, as shown in FIG. 2, a width θ of each of the induction coils 28n and 28s and common coils 30n and 30s in the circumferential direction of the rotor 14 is set to be shorter than a width corresponding to 180° of electrical angle of the rotor 14. The induction coils 28*n* and 28*s* and the common coils 30*n* and 30*s* are wound in short pitch windings around the salient poles 32*n* and 32*s*. More preferably, the width θ of each of the induction coils 28*n* and 28*s* and common coils 30*n* and 30*s* in the circumferential direction of the rotor 14 is set to be equal to, or substantially equal to, a width corresponding to 90° of electrical angle of the rotor 14. The width θ of the each of the induction coils 28*n* and 28*s* and common coils 30*n* and 30*s* may be expressed by a central width of a cross-section of each of the induction coils 28*n* and 28*s* and common coils 30*n* and 30*s*, taking into account the sectional area of each of the induction coils 28*n* and 28*s* and the common coils 30*n* and 30*s*. That is the width θ of the each of the induction coils 28*n* and 28*s* and common coils 30*n* and 30*s* can be expressed by an average value of the width of the inner peripheral surface and the width of the outer peripheral surface of each of the induction coils 28*n* and 28*s* and common coils 30*n* and 30*s*.

Also, the rotor 14 includes auxiliary salient poles 42 that are auxiliary protruding portions that protrude from the surfaces on both sides in the circumferential direction of the salient poles 32*n* and 32*s* that are arranged in a plurality of locations in the circumferential direction, and are one example of a magnetic flux inducing portion. The auxiliary salient poles 42 are plate-shaped magnetic bodies each of which protrudes in an inclined direction with respect to the circumferential direction, from a plurality of locations in the axial direction (i.e., the front-back direction in FIGS. 3 and 4) on both side surfaces in the circumferential direction (i.e., in the left-right direction in FIGS. 3 and 4) of the salient poles 32*n* and 32*s*. For example, in the illustrated example, the auxiliary salient poles 42 are inclined with respect to the circumferential direction so as to be farther toward the radial outside of the rotor 14 toward the tip end, on radially middle portions of both side surfaces in the circumferential direction of the salient poles 32*n* and 32*s*. The plurality of auxiliary salient poles 42 protrude from between the N-pole induction coil 28*n* and the N-pole common coil 30*n*, and from between the S-pole induction coil 28*s* and the S-pole common coil 30*s*, on both side surfaces in the circumferential direction of the salient poles 32*n* and 32*s*. That is the auxiliary salient poles 42 are magnetically connected to the corresponding salient poles 32*u* and 32*s* at base portions. Also, the auxiliary salient poles 42 provided on the salient poles 32*n* and 32*s* protrude such that a plurality of the auxiliary salient poles 42 face one another across, a gap in the axial direction, from a plurality of locations in the axial direction on each side surface in the circumferential direction of the corresponding salient poles 32*n* (or 32*s*).

Figure 8:
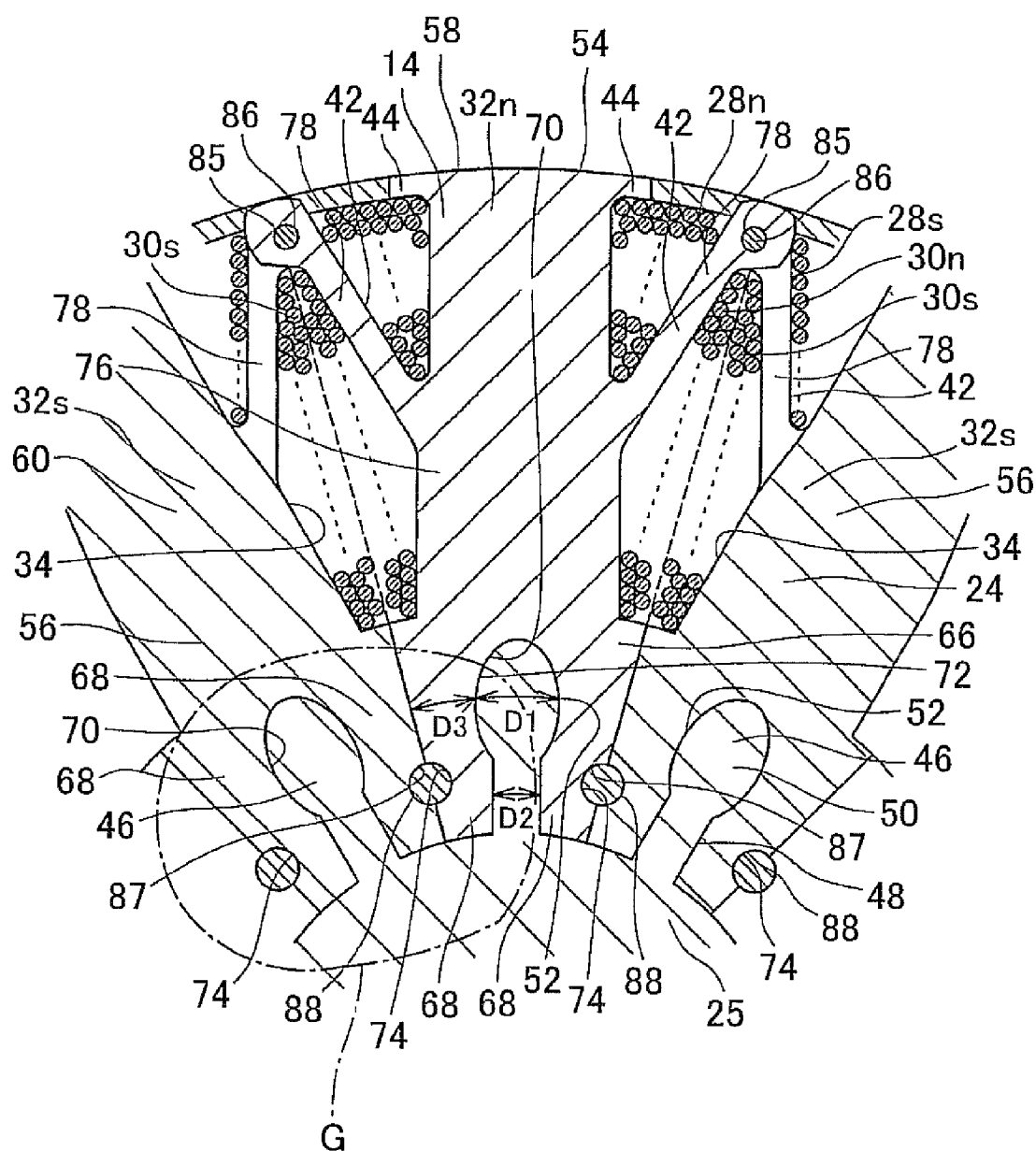
FIG. 8 is an enlarged view of portion B in FIG. 7.

Also, a plurality of the auxiliary salient poles 42 that are arranged in the same slot 34 and protrude from different salient poles 32*n* and 32*s* that oppose one another are mechanically connected together. However, a plurality of auxiliary salient poles 42 that protrude inside the same slot 34 from different salient poles 32*n* and 32*s* that oppose one another may also be magnetically separated from each other. FIGS. 3 and 4 are views showing frame formats of a case in which the auxiliary salient pole 42 of the N-pole forming salient pole 32*n* and the auxiliary salient pole 42 of the S-pole forming salient pole 32*s* that are arranged in the same slot are magnetically separated from each other. These kinds of auxiliary salient poles 42 are formed by the same magnetic material as the auxiliary salient poles 42 that include the salient poles 32*n* and Also, the induction coil 28*n* (or 28*s*) and the common coil 30*n* (or 30*s*) that are wound around the salient pole 32*n* (or 32*s*) are separated by the auxiliary salient poles 42 in the corresponding slot 34. The induction coils 28*n* and 28*s* and the common coils 30*n* and 30*s* that are wound around the same salient poles 32*n* and 32*s* are connected together at a portion away from the auxiliary salient poles 42, such as the coil end side on one side or both sides, not shown, provided, farther toward the outside than the axial end surface (i.e., the end surface in the axial direction) of the rotor core 24. As shown in FIG. 8 that will be described later, a flange portion 44 that protrudes out on both sides in the circumferential direction to inhibit the induction coils 28*n* and 28*s* from slipping off may also be formed on the tip end portion of each salient pole 32*n* (and 32*s*). This flange portion 44 may also be omitted.

In the rotary electric machine 10 having this kind of rotor 14 (FIG. 2), the rotating magnetic field (i.e., the fundamental component) created in the teeth 18 (FIG. 2) acts on the rotor 14 by passing three-phase alternating current through the stator coils 20*u*, 20*v*, and 20*w* of the three phases. In response to this, the salient poles 32*n* and 32*s* are attracted to the rotating magnetic field, such that the magnetic resistance of the rotor 14 decreases. As a result, torque (i.e., reluctance torque) acts on the rotor 14.

Also, when the rotating magnetic field that includes the spatial harmonic component created in the teeth 18 is interlinked to the induction coils 28*n* and 28*s* of the rotor 14, induction electromotive force is generated in the induction coils 28*n* and 28*s* by the magnetic flux fluctuation of a frequency that differs from the rotation frequency (i.e., the fundamental component of the rotating magnetic field) of the rotor 14 due to the spatial harmonic component. Current that flows through the induction coils 28*n* and 28*s* with the generation of this induction electromotive force is rectified by the diodes 38 and 40 so that it flows in one direction (i.e., so that it is direct current). Also, the salient poles 32*n* and 32*s* become magnetized in response to the direct current that has been rectified by the diodes 38 and 40 flowing through the induction coils 28*n* and 28*s* and the common coils 30*n* and 30*s*, and as a result, each of the salient poles 32*n* and 32*s* serves as a magnet in which the magnetic pole (either an N-pole or an S-pole) is fixed. As described above, the rectifying directions of the current in the induction coils 28*n* and 28*s* according to the diodes 38 and 40 are reversed, so the magnets produced in the salient poles 32*n* and 32*s* are such that N-poles and S-poles are arranged alternately in the circumferential direction.

Moreover, as shown in FIG. 3, the auxiliary salient poles 42 are formed inclined with respect to the circumferential direction so as to be farther radial outward toward the tip end, on both side surfaces in the circumferential direction of the salient poles 32*n* and 32*s*. Therefore when considering a case in which q-axis magnetic flux that is magnetic flux of a spatially second-order spatial harmonic flows as magnetomotive force of the stator 12 from the stator 12 to the rotor 14, for example, most of the magnetic flux is able to be interlinked to the induction coils 28*n* and 28*s* by the auxiliary salient poles 42. That is, with a given positional relationship of the stator 12 and the rotor 14, there is a case in which the q-axis magnetic flux of the spatial harmonic is mostly directed from a portion of the teeth 18 of the stator 12 to a portion of the salient poles 32*n* and 32*s* via a portion of the auxiliary salient pales 42, and then directed from a portion of the salient poles 32*n* and 32*s* to different teeth 18, in which case most of the magnetic flux can be interlinked to the induction coils 28*n* and 28*s*. Also, the orientation and amount of the q-axis magnetic flux changes within one electric cycle, but the maximum amount of magnetic flux that flows through the induction coils 28*n* and 28*s* increases, so the change in the interlinkage magnetic flux of the induction coils 28n and 28s can be increased. For example, as shown by the broken arrow β in FIG. 3, there is a case in which the q-axis magnetic flux flows from the teeth 18 of the stator 12 to the S-pole forming salient pole 32S via an auxiliary salient pole 42 that is an S-pole, in which case the magnetic flux attempts to flow in the direction that would turn the S-pole forming salient pole 32s into an N-pole. In this case, induction current attempts to flow through the S-pole induction coil 28s in a direction that will inhibit this, and this flow is unable to be inhibited by the second diode 40 (FIG. 4). Therefore, magnetic flux from the induction current, that is magnetic flux in a direction from the S-pole forming salient pole 32s out through the N-pole forming salient pole 32n via the rotor yoke 33 of the rotor core 24, flows in as indicated by the solid arrow in FIG. 3.

Also, there is a case in which the q-axis magnetic flux attempts to flow opposite this, i.e., in the direction opposite the broken arrow α in FIG. 3, from the teeth 18 of the stator 12 to the auxiliary salient pole 42 via the N-pole forming salient pole 32n, in which case the magnetic flux attempts to flow in a direction that would turn the N-pole forming salient pole 32n into an S-pole. In this case, induction current attempts to flow through the N-pole induction coil 28n in a direction that will inhibit this, and this flow is unable to be inhibited by the first diode 38 (FIG. 4). As a result, current flows in the direction that turns the N-pole forming salient pole 32n into an N-pole. In this case as well, magnetic flux from the induction current flows in a direction from the S-pole forming salient pole 32s out through the N-pole forming salient pole 32n via the rotor yoke 33. As a result, the salient poles 32n and 32s are magnetized to N-poles or S-poles. As described above, the auxiliary salient poles 42 protrude from both side surfaces of the salient poles 32n and 32s, so compared with a case in which there are no auxiliary salient poles 42, i.e., in which there are only spaces between salient poles 32n and 32s that are adjacent in the circumferential direction in the slots 34, the maximum value of amplitude of magnetic flux that interlinks to the induction coils 28n and 28s is able to be increased, so the change in the interlinkage magnetic flux can be increased.

Also attraction and repulsion are created by the interaction of the magnetic field of the salient poles 32n and 32s (i.e., the magnets in which the magnetic poles are fixed) with the rotating magnetic field (i.e., the fundamental component) generated by the stator 12. Torque (i.e., torque corresponding to the magnet torque) is able to be applied to the rotor 14 also by the electromagnetic interaction (i.e., attraction and repulsion) between the rotating magnetic field (i.e., the fundamental component) generated by the stator 12 and the magnetic field of the salient poles 32n and 32s (i.e., the magnets). As a result, the rotor 14 is rotatable driven in synchronization with the rotating magnetic field (i.e., the fundamental component) generated in the stator 12. In this way, the rotary electric machine 10 is able to serve as a motor that generates power (i.e., mechanical power) in the rotor 14 using electric power supplied to the stator coils 20u, 20v, and 20w.

Figure 6:
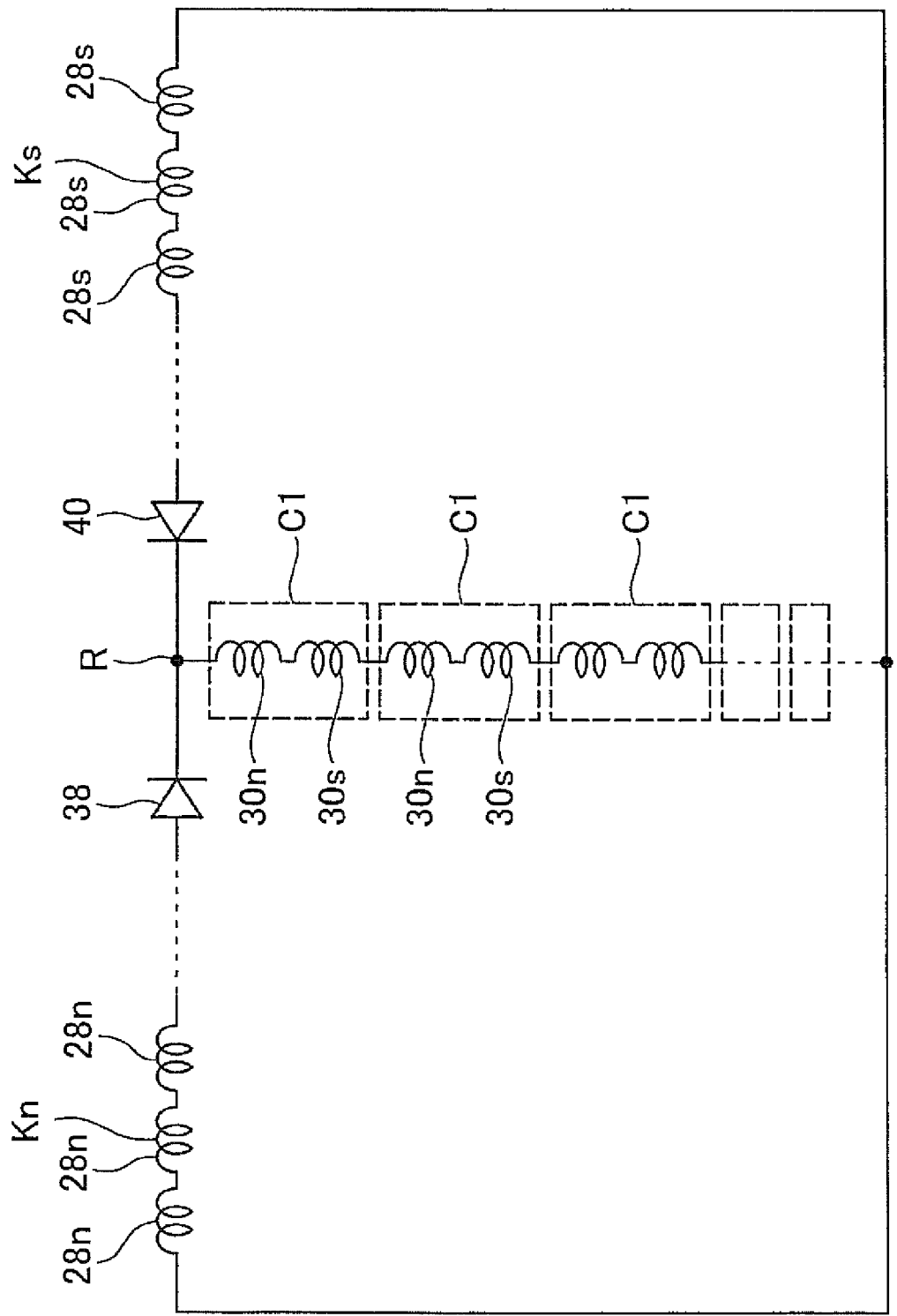
FIG. 6 is a view corresponding to FIG. 5, of another example in which the number of diodes connected to the rotor coils has been reduced.

In the description above, a case is described in which, with two adjacent salient poles 32n and 32s constituting one pair, induction coils 28n and 28s that are wound around two salient poles 32n and 32s are connected together via two diodes 38 and 40 in each pair. Therefore, two diodes 38 and 40 are needed for two salient poles 32n and 32s. In contrast, it is also possible to connect all of the coils 28n, 28s, 30n, and 30s that are wound around all of the salient poles 32n and 32s of the rotor 14 together and use only two diodes 38 and 40. FIG. 6 is a view corresponding to FIG. 5, of another example in which the number diodes connected to the rotor coils has been reduced. In this other example shown in FIG. 6, with the structure shown in FIGS. 3 and 4 and the like described above, an N-pole induction coil pair Kn is formed by connecting together in series a plurality of N-pole induction coils 28n that are wound around the tip end sides of all of the N-pole forming salient poles 32n (see FIG. 3) that are every other salient pole in the circumferential direction of the rotor, and an S-pole induction coil pair Ks is formed by connecting together in series a plurality of S-pole induction coils 28s that are wound around the tip end sides of all of the S-pole forming salient poles 32s (see FIG. 3) that are adjacent to the N-pole forming salient poles 32n of the rotor. One end of the N-pole induction coil pair Kn and one end of the S-pole induction coil pair Ks are connected together at a connection point R via the first diode 38 and the second diode 40 where the forward directions become reversed.

Moreover, when two adjacent salient poles, i.e., an N-pole forming salient, pole 32n and an S-pole forming salient pole 32s that are adjacent in the circumferential direction of the rotor (see FIG. 3), constitute one pair, a common coil pair C1 is formed by connecting together in series the N-pole common coil 30n and the S-pole common coil 30s in each pair, and all of the common coil pairs C1 related to all of the salient poles 32n and 32s are connected together in series. Furthermore, of the plurality of common coil pairs C1 that are connected together in series, one end of the N-pole common coil 30n of one common coil pair C1 that forms one end is connected to the connection point R, and one end of the S-pole common coil 30s of another common coil pair C1 that forms the other end is connected to the other end of the N-pole induction coil pair Kn and the other end of the S-pole induction coil pair Ks on the side opposite the connection point R. Unlike the structure shown in FIGS. 4 and 5 described above, this kind of structure makes it possible to reduce the total number, of diodes provided in the rotor to just two, i.e., the first diode 38 and the second diode 40.

The basic structure and operation of the rotary electric machine 10 that includes the rotor 14 of this example embodiment is described above. In the example embodiment, the rotor 14 employs a structure that includes a plurality of rotor core elements arranged in a plurality of locations in the circumferential direction. Therefore, the specific structure described below is employed. The specific structure of the rotor 14 will be described with reference to FIGS. 7 to 17. In FIGS. 7 to 17, elements that are the same as or that correspond to elements shown in FIGS. 1 to 6 described above will be denoted by the same reference characters.

Figure 7:
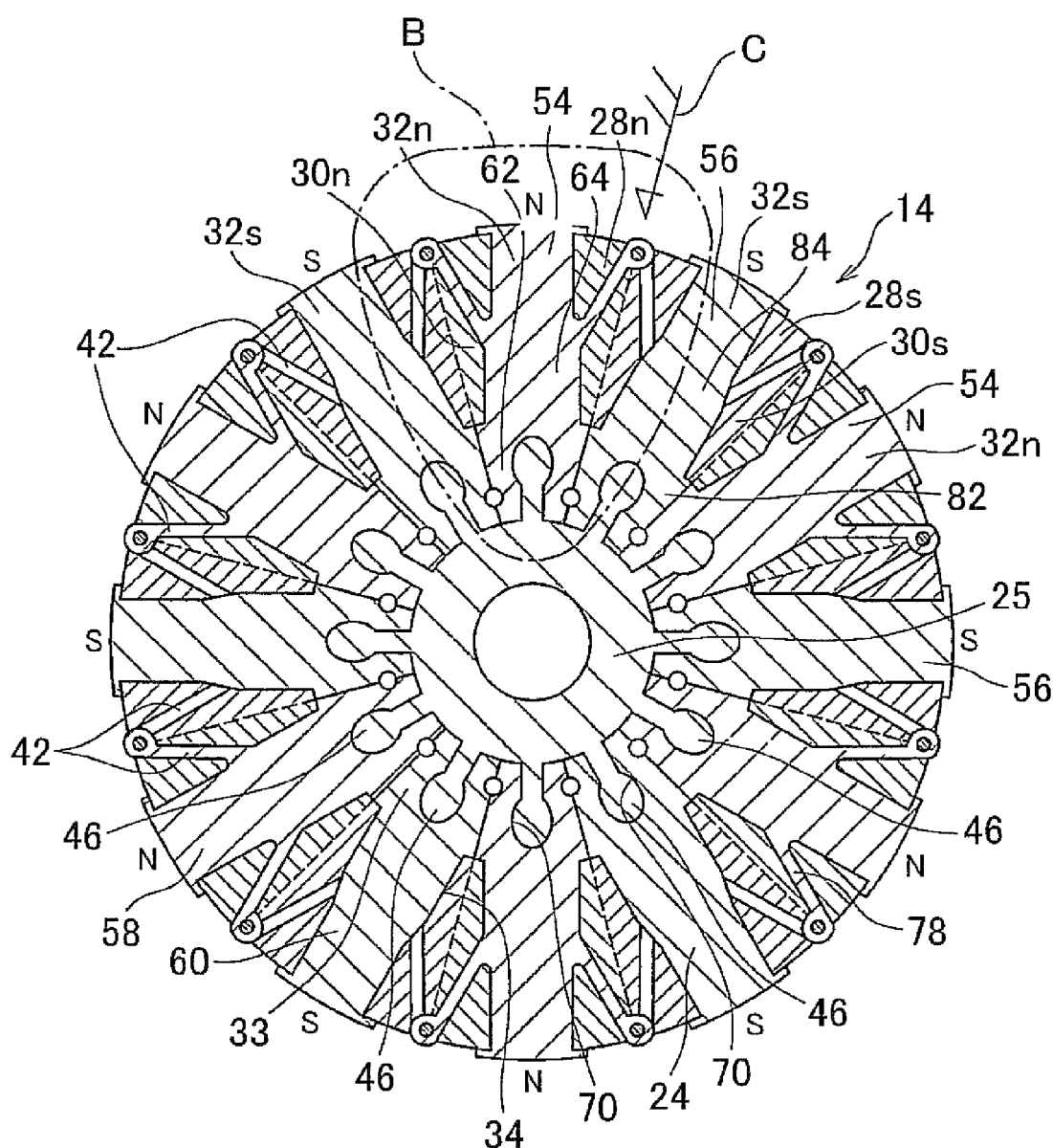
FIG. 7 is a sectional view of the rotor taken along line A-A in FIG. 1.
Figure 9:
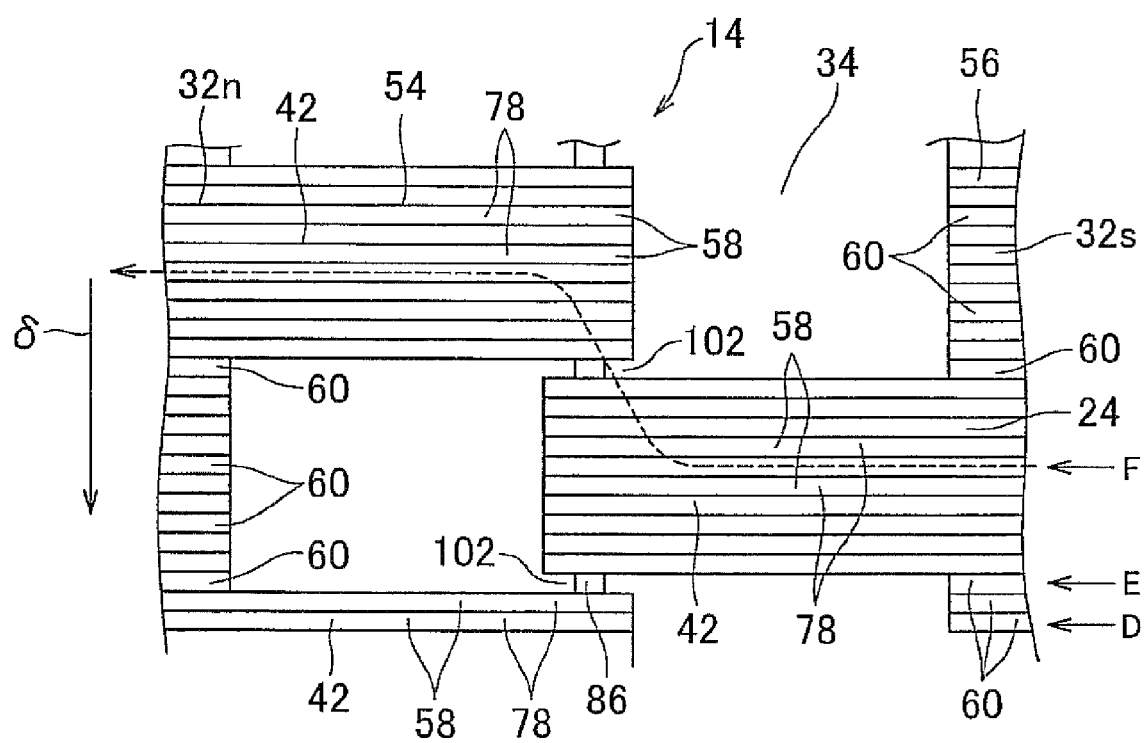
FIG. 9 is an enlarged view from the direction of arrow C in FIG. 7 with a portion omitted.
Figure 10:
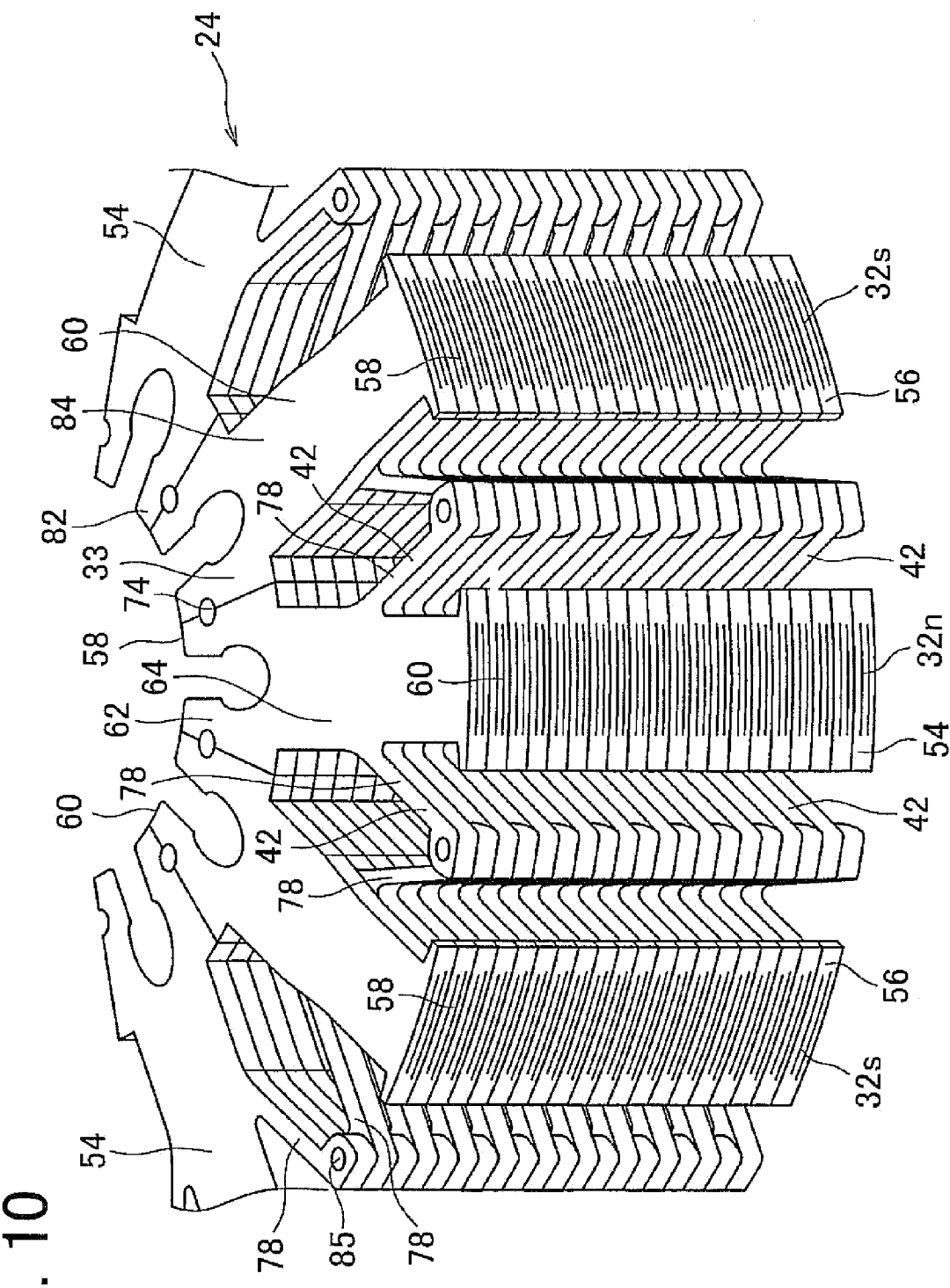
FIG. 10 is a perspective view of a circumferential portion (i.e., a portion in the circumferential direction) of a rotor core, showing only the rotor core as it appears removed from FIG. 1.
Figure 11:
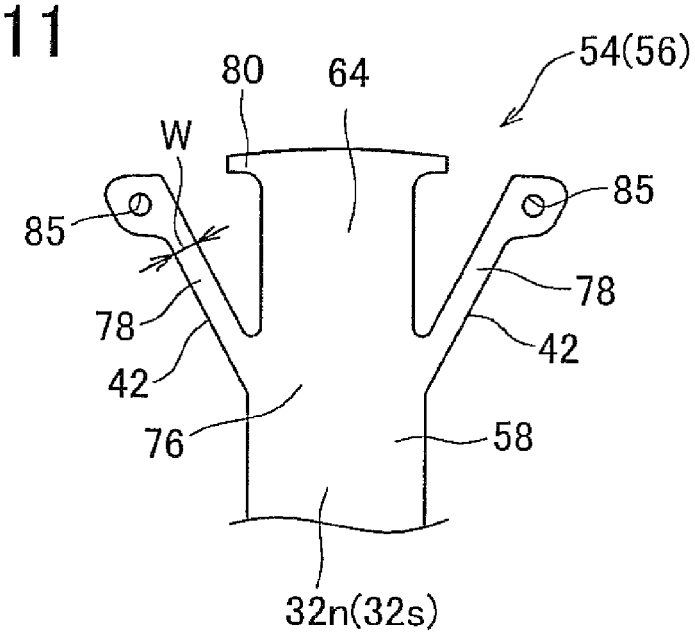
FIG. 11 is a view from the axial direction, of a tip end portion of a first core element or a second core element) that forms the rotor core shown in FIG. 1.
Figure 12:
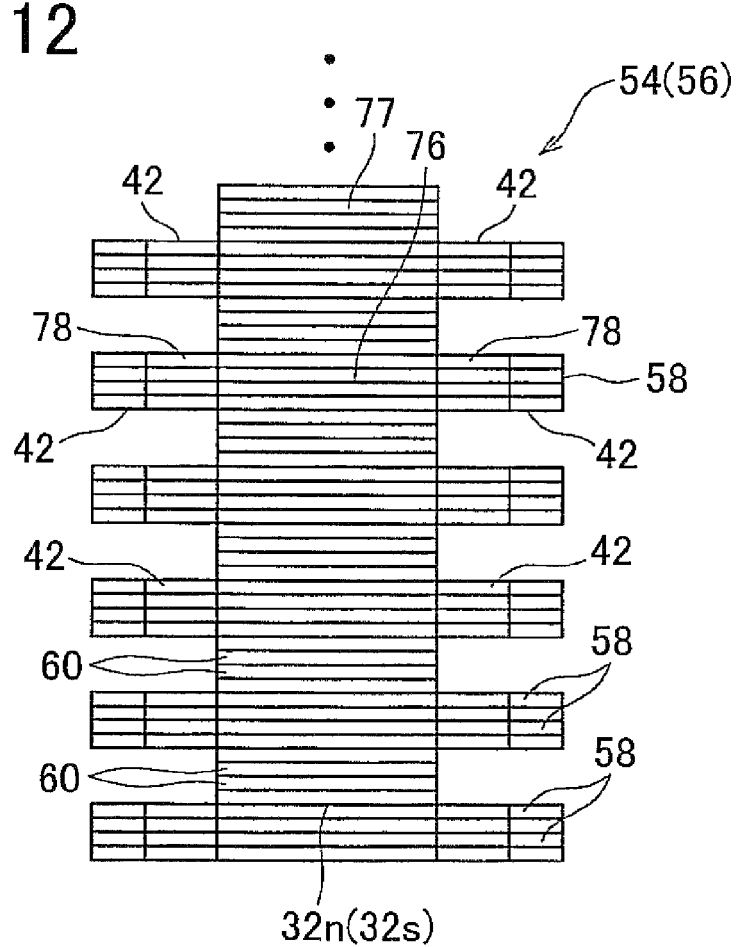
FIG. 12 is a view of an axial portion (i.e., a portion in the axial direction), when
Figure 13:
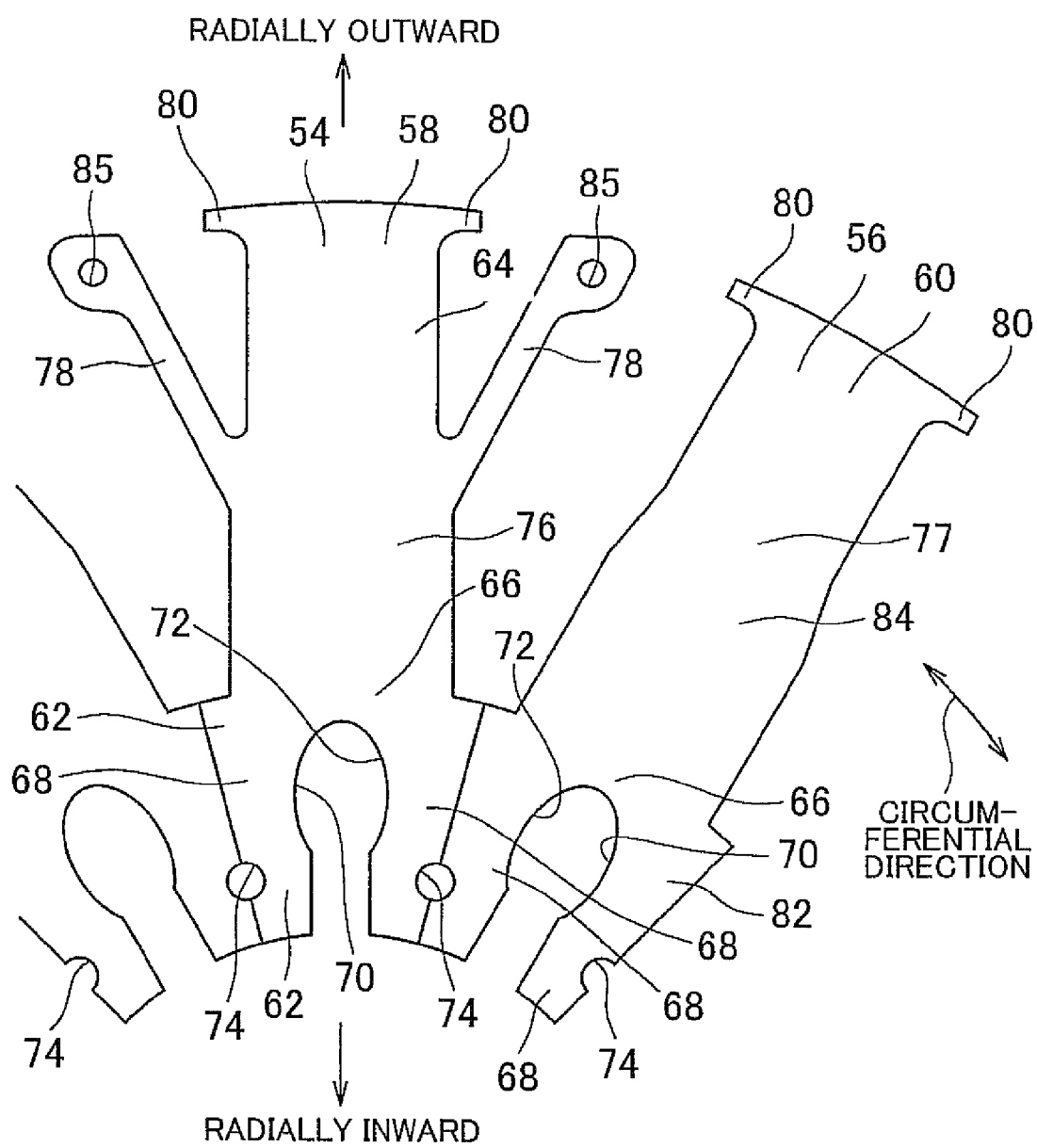
FIG. 13 is a view of a circumferential portion of a plurality of plate members of the rotor core that are arranged at the position indicated by arrow D in FIG. 9.
Figure 14:
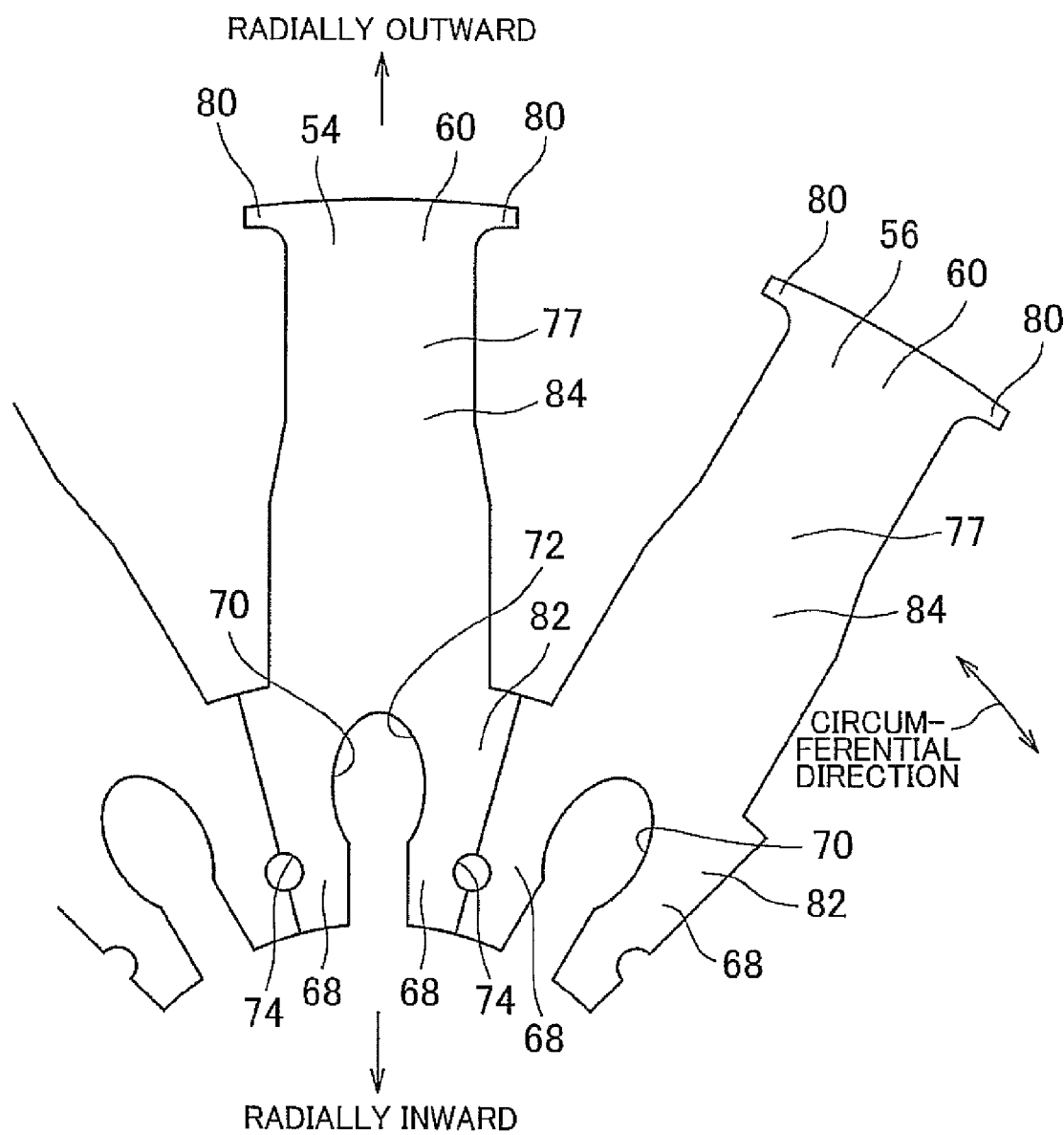
FIG. 14 is a view of a circumferential portion of the plurality of plate members of the rotor core that are arranged at the position indicated by arrow E in FIG. 9.
Figure 15:
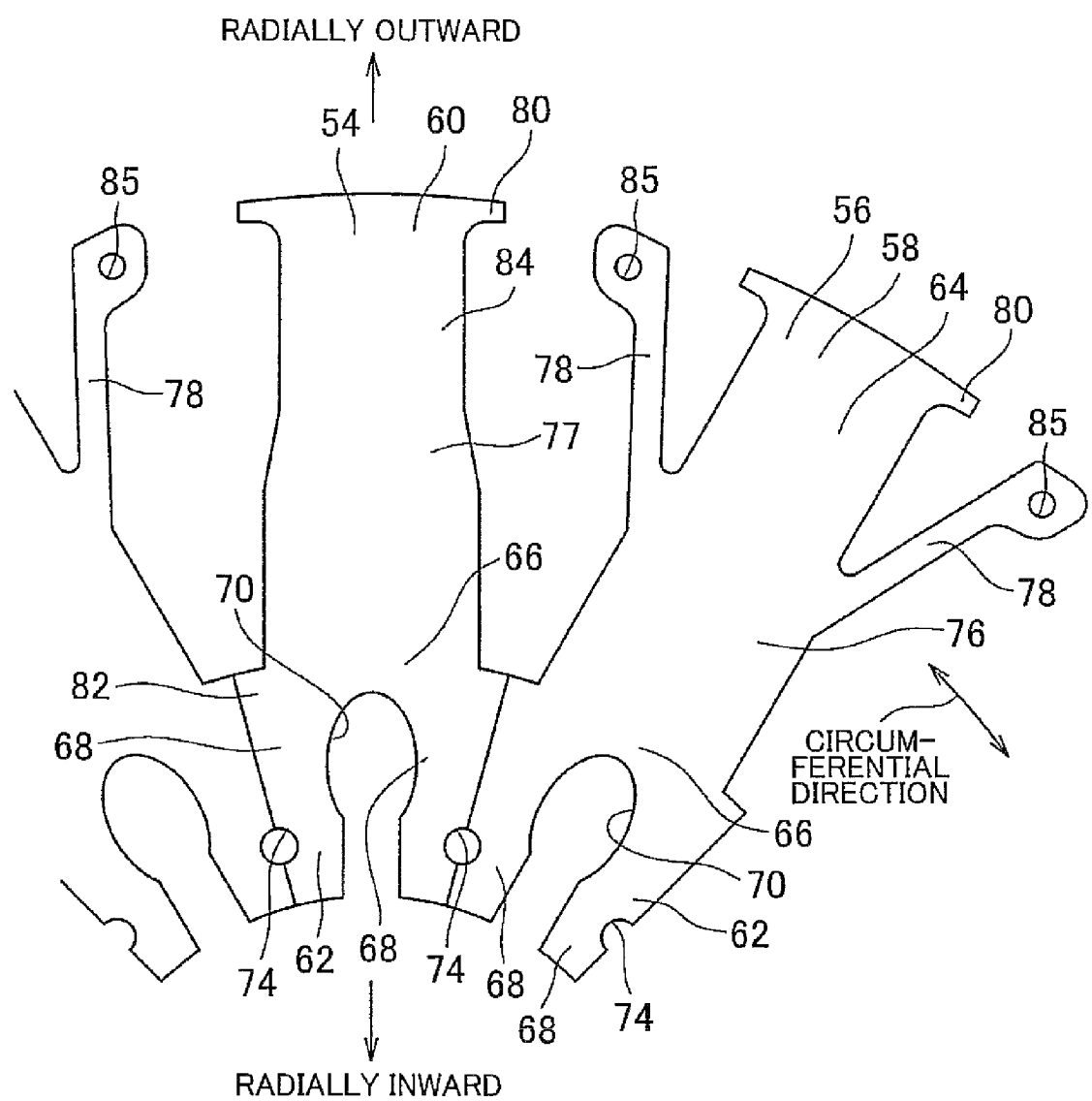
FIG. 15 is a view of a circumferential portion of the plurality of plate members of the rotor core that are arranged at the position indicated by arrow F in FIG. 9.

FIG. 7 is a sectional view of the rotor 14 taken along line A-A in FIG. 1. FIG. 8 is an enlarged view of portion B in FIG. 7. FIG. 9 is an enlarged view from the direction of arrow C in FIG. 7 with a portion omitted. FIG. 10 is a perspective view of a circumferential portion (i.e., a portion in the circumferential direction) of the rotor core, showing only the rotor core as it appears removed from FIG. 1. FIG. 11 is a view from the axial direction, of a tip end portion of a first core element (or a second core element) that forms the rotor core shown in FIG. 10. FIG. 12 is a view of an axial portion (i.e., a Portion in the axial direction), when FIG. 11 is viewed from up to down. FIGS. 13 to 15 are views of a circumferential portion of a plurality of metal plates of the rotor core that are arranged at positions indicated by arrows D, E, and F in FIG. 9, As shown in FIG. 7, the rotor 14 of this example embodiment includes the rotor core 24, and the shaft 25 that is fixedly fitted to a center portion of the rotor core 24. The shaft 25 includes a plurality of outer protruding portions 46 that are provided in a plurality of locations in the circumferential direction on the outer peripheral surface and that protrude in the radial direction. As shown in FIG. 8, each of the outer protruding portions 46 is a long shape in the axial direction with the same sectional shape relating to the plane orthogonal to the axial direction overall. Each of the outer protruding portions 46 has a shaft-side base portion 48, having a small circumferential width, and a shaft-side tip end portion 50 that is connected to the shaft-side base portion 48, and that has a circumferential width larger than the circumferential width of the shaft-side base portion 48. The shaft-side tip end portion 50 has a generally ellipsoid sectional shape. The shaft-side tip end portion 50 has a widest portion 52 (FIG. 8) where the width in the circumferential direction is greatest. A width D1 in the circumferential direction of the widest portion 52 is greater than a widest dimension D2 (FIG. 8) in the circumferential direction of the shaft-side base portion 48. The shaft 25 is made of highly rigid material such as solid material that is steel material that does not contain silicon.

As shown in FIG. 10, the rotor core 24 includes first core elements 54 and second core elements 56, each of which are a plurality of rotor core elements. The rotor core 24 is formed by arranging the first core elements 54 and the second core elements 56, alternately one by one in the circumferential direction and connecting them together in a circle. Each of the core elements 54 and 56 is formed by stacking a plurality of plate members together in the axial direction. That is, each of the core elements 54 and 56 includes a plurality of plate members having different shapes, i.e., a plurality of first plate members 58 that are one example of two-armed steel elates that have two arms, and a plurality of second plate members 60 that are one example of armless steel plates that have no arms. Each of the plate members 58 and 60 is a magnetic steel plate such as an electromagnetic steel plate such as a silicon steel plate. As shown in FIGS. 13 and 15, each or the first plate members 58 that are two-armed steel plates includes a first rotor-side base portion 62 provided on a side that is coupled to the shaft 25, and a first rotor-side tip end portion 64 that is connected to the radial outside of the first rotor-side base portion 62. The first rotor-side base portion 62 forms the rotor yoke 33 (FIGS. 7 and 10), and the first rotor-side tip end portion 64 forms the N-pole forming salient pole 32n Or the S-pole forming salient pole 32s (FIGS. 7 and 10).

As shown in FIGS. 13 and 15, the first rotor-side base portion 62 includes two leg portions 68 that protrude radially inward on both sides in the circumferential direction of a base portion 66. An inner recessed portion 70 is formed on a radially inner surface of the first rotor-side base portion 62, including the inner surface between the two leg portions 68. The outer protruding portions 46 provided on the shaft 25 (FIG. 7) are fitted in the axial direction inside the inner recessed portions 70. Each inner recessed portion 70 has a wide portion 72 that is formed open to the radially inner end of the core elements 54 and 56, and where the circumferential width increases at a deep portion. Both side surfaces in the circumferential direction of the first rotor-side base portion 62 are aligned with the radial direction of the rotor 14. A semicircular portion 74 is formed in a portion that is farther toward the radial inside than the portion where the circumferential width of the inner recessed portion 70 is greatest, on both side surfaces in the circumferential direction of the first rotor-side base portion The first rotor-side tip end portion 64 has a generally rectangular trunk portion 76, and inclined protruding portions 78 (in this specification, these portions may also be referred to simply as "protruding portions" or portions that protrude" or the like) that are an example of magnetic flux inductive plate portions that protrude in directions inclined with respect to the circumferential direction from both side surfaces in the circumferential direction of the trunk portion 76, i.e., from both side surfaces in the width direction of the trunk portion 76. The inclined protruding portions 78 form the auxiliary salient poles 42 described above (FIG. 2 and the like). Circumferentially protruding portions 80 that form the flange portions 44 (FIG. 8) are formed on both side surfaces in the circumferential direction of the tip end portion of each trunk portion 76.

These kinds of first plate members 58 are stacked together with the second plate members 60 shown in FIGS. 13 to 15. Like the first plate members 58, each second plate member 60 also includes a second rotor-side base portion 82 that is provided on a side that is coupled to the shaft 25, and a second rotor-side tip end portion 84 that is connected to the radial outside of the second rotor-side base portion 82. The second rotor-side base portion 82 has the same shape as the first rotor-side base portion 62, with two leg portions 68 and an inner recessed portion 70. The second rotor-side tip end portion 84 has a second trunk portion 77 that is the same shape as the trunk portion 76 of the first rotor-side tip end portion 64 (FIG. 13) of the first plate member 58, but no inclined protruding portions 78 (FIG. 13) are formed on both side surfaces in the circumferential direction of this second trunk portion 77. The other shapes and sizes of the second plate member 60 are the same as those of the first plate members 58. That is like the first plate members 58, each second plate member 60 has a semicircular portion 74 formed on both side surfaces in the circumferential direction of the second rotor-side base portion 82, and has circumferentially protruding portions 80 on the tip end side. If the flange portion 44 is omitted, the circumferentially protruding portions 80 may also be omitted. The plate members 58 and 60 are formed bilaterally symmetrical about the center in the circumferential direction. Also, the first plate members 58 and the second plate members 60 have the same or substantially the same thickness, for example.

Also, as shown in FIGS. 11 and 12, the first core elements 54 that include the N-pole forming salient poles 32n are formed by repeatedly stacking the plurality of stacked second plate members 60 onto the plurality of stacked first plate members 58. Also, the second core elements 56 that include the S-pole forming salient poles 32s are formed by repeatedly stacking the plurality of stacked first plate members 58 onto the plurality of stacked second plate members 60. In this case, as shown in FIG. 10, the positions in which the same type of first plate members 58 (or 60) are arranged in the axial direction are offset in the first core elements 54 with respect to the second core elements 56 at at least a portion, when the first core elements 54 and the second core elements 56 are arranged such that the tip end portions of the inclined protruding portions 78 of each are aligned when viewed in the axial direction (i.e., in the vertical direction in FIG. 10). Therefore, the axial positions of the inclined protruding portions 78 are offset in the first core elements 54 with respect to the second core elements 56.

Furthermore, as shown in FIG. 10, gaps in the axial direction are formed between tip end portions of the inclined protruding portions 78 with adjacent core elements 54 and 56, when the tip end portions of the inclined protruding portions 78 are aligned when viewed from the axial direction. Therefore, as shown in FIG. 9, the number of stacked second plate members 60 is two, or three or more, greater than the number of stacked first plate members 58. Also, as shown in FIG. 8, the N-pole common coil 30n is wound around the first core elements 54 in a position farther toward the base side of first core elements 54 than the inclined protruding portions 78, and the N-pole induction coil 28n is wound around the first core elements 54 in a position farther toward the tip end side of the first core elements 54 than the inclined protruding portions 78. Also, the S-pole common coil 30s is wound around the second core elements 56 in a position farther toward the base side of the second core elements 56 than the inclined protruding portions 78, and the S-pole induction coil 28s is wound around the second core elements 56 in a position farther toward the tip end side of the second core elements 56 than the inclined protruding portions 78.

Also, as shown in FIGS. 7 and 10, the first core elements 54 and the second core elements 56 are arranged alternately in the circumferential direction and abutted together in a circle. In this case, the side surfaces in the circumferential direction of the rotor-side base portions 62 and 82 of the adjacent core elements 54 and 56 contact each other in the circumferential direction. Also, as shown in FIGS. 9 and 10, the tip end portions of the inclined protruding portions 78 of the first core elements 54 and the tip end portions of the inclined protruding portions 78 of the second core elements 56 that are adjacent in the circumferential direction are arranged such that pin holes 85 in these tip end portions are aligned in the axial direction, i.e., overlap when viewed from the axial direction.

Also, a connecting pin 86 is inserted into the plurality of pin holes 85 that are aligned with each other in the axial direction, at a portion of the adjacent core elements 54 and 56 where the inclined protruding portions 78 overlap when viewed from the axial direction. The connecting pin 86 may also be inhibited from slipping out by crimping either one or both end portions of each connecting pin 86 that protrude toward the outside from the first core elements 54 (or 56). When forming a crimped portion at only one end portion of each connecting pin 86, a head portion where a predetermined diameter is larger than the other portions may be integrally formed on the other end portion of each connecting pin 86 to inhibit the connecting pins 86 from slipping out. In this case, the connecting pins 86 are inserted from the end opposite the head portion into a plurality of corresponding pin holes 85, and crimped portions are formed on portions that protrude toward the outside from the axial end portion of the rotor core 24. The core elements 54 and 56 may also be able to be connected by the connecting pins in a manner that enables the core elements 54 and 56 to pivot about the connecting pins 86. The connecting pins 86 may also be inserted into the corresponding pin holes 85 by press-fitting.

Also, the semicircular portions 74 of the plurality of plate members 58 and 60 that are stacked in the core elements 54 and 56 are aligned with each other in the axial direction, thereby forming a long semi-cylindrical portion in the axial direction. Also, a generally cylindrical pin engaging portion 87 is formed facing the semi-cylindrical portions that face each other at the base portion of the adjacent core elements 54 and 56. That is, the pin engaging portions 87 are arranged in a plurality of locations in the circumferential direction of the plurality of core elements 54 and 56. A rattle reducing pin 88 is able to be inserted into each pin engaging portion 87. In this way, the rotor core 24 is formed.

The N-pole forming salient pole 32n and the S-pole forming salient pole 32 that are arranged alternately in the circumferential direction of the rotor core 24 are formed by the portions of the care elements 54 and 56 where the trunk portions 76 and 77 overlap. Also, the auxiliary salient poles 42 that are one example of a plurality of magnetic flux inducing portions are formed by the portion where the plurality of inclined protruding portions 78 are stacked together, in a plurality of locations in the circumferential direction of the rotor core 24. That is, as shown in FIG. 12, the plurality of auxiliary salient poles 42 that protrude from a plurality of locations in the axial direction on both side surfaces in the circumferential direction of the salient poles 32n and 32s are formed by portions of the plurality of first plate members 58 where the inclined protruding portions 78 are stacked together. That is, the auxiliary salient poles 42 are rained by stacking the inclined protruding portions 78, that are provided protruding, of a portion of the plurality of first plate members 58 that form a corresponding salient pole 32n (or 32s). The auxiliary salient poles 42 and the inclined protruding portions 78 are not limited to structures formed in a direction inclined with respect to the circumferential direction of the salient poles 32n and 32s. Alternatively, the auxiliary salient poles 42 and the inclined protruding portions 78 may also extend in the circumferential direction of the salient poles 32n and 32s or employ shapes having curved portions, or the like. Also, the generally annular-shaped rotor yoke 33 is formed by a portion of the core elements 54 and 56 where the rotor-side base portions 62 and 82 are abutted together in a circle. In this state, when considering the rotor core 24 from a cross-section orthogonal to the axial direction, three different shapes in FIGS. 13 to 15 are formed according to different positions in the axial direction. FIGS. 13 to 15 are views showing the same area of the rotor core 24 in the circumferential direction. For example, in one position in the axial direction in FIG. 13, the first plate member 58 is arranged on the first core element 54, and the second plate member 60 is arranged on the second core element 56. In another position in the axial direction in FIG. 14, the second plate member 60 is arranged on both the first core element 54 and the second core element 56. In yet another position in the axial direction in FIG. 15, the second plate member 60 is arranged on the first core element 54, and the first plate member 58 is arranged on the second core element 56. That is, when the rotor core 24 is viewed from one side toward the other side in the axial direction, as indicated by the direction of arrow σ in FIG. 9, a portion where a predetermined plurality of first plate members 58 are stacked together and a portion where a predetermined plurality of second plate members 60 are stacked together, are adjacent to each other in the circumferential direction the right-left direction in FIG. 9), and a layer in which single second plate members 60 are arranged adjacent to one another in the circumferential direction is stacked on the other side (i.e., the lower side in FIG. 9) of each of those portions. Also, a portion where a predetermined plurality of second plate members 60 are stacked together and a portion where a predetermined plurality of first plate members 58 are stacked together, are adjacent to each other in the circumferential direction, and these portions are stacked on the other side of this layer. Then another layer in which single second plate members 60 are arranged adjacent to one another other in the circumferential direction is stacked on the other side of each of these portions, and this is repeated.

As shown in FIG. 8, resin is filled inside of a space within which the induction coils 28n and 28s and the common coils 30n and 30s are arranged, inside the slots 34 of the rotor core 24. Therefore, the coils 28n, 28s, 30n, and 30s are fixed and therefore inhibited from coming off of the rotor core 24. Further, wire made of carbon fiber may also be wound around the outer peripheral surface of the rotor core 24. This structure makes it possible to even more effectively inhibit the coils 28n, 28s, 30n, and 30s from coming off.

This kind, of rotor core 24 may be manufactured according to the method described below, for example. First, in a state in which only one of the plurality of connecting pins 86 is removed from two adjacent core elements 54 and 56, and the auxiliary salient poles 42 of adjacent core elements 54 and 56 are connected via the other connecting pins 86, the core elements 54 and 56 are lined up in a single line or the like, and the corresponding induction coils 28n and 28s and the corresponding common coils 30n and 30s are wound around the salient poles 32n and 32s. For example, the common coils 30n and 30s may be in an air-core wound state and fitted to the trunk portions 76 and 77 from the base side of the corresponding core elements 54 and 56. Next, adjacent core elements 54 and 56 are pivoted about the connecting pins 86 so as to be arranged in a circle, and the connecting pin 86 is inserted into the pin hole 85 without a pin in it, thus enabling the rotor core 24 to be formed.

Also, as shown in FIG. 1, the rotor 14 includes the shaft 25 that is fitted to the center portion of the rotor core 24, and two end plates 26a and 26b that are fixed to the shaft 25. In this case, as shown in FIG. 7, the outer protruding portions 46 described above are formed in a plurality of locations in the circumferential direction on the outer peripheral surface of the shaft 25. The axial length of the outer protruding portions 46 is substantially the same as, or slightly longer than, the axial length of the rotor core 24, for example. The outer protruding portions 46 are fitted in the axial direction into the inner recessed portions 70 of the core elements 54 and 56. Therefore, the shaft 25 is fitted in the axial direction inside the rotor core 24, such that the outer protruding portions 46 are fit in the axial direction into the inner recessed portions 70 of the rotor core 24. Also, with the shaft 25 fitted in the rotor core 24, the plurality of rattle reducing pins 88 are pushed, i.e., inserted, in the axial direction into the plurality of pin engaging portions 87, such that the leg portions 68 of adjacent core elements 54 and 55 are pushed apart, as shown in FIG. 8.

Furthermore, as shown in FIG. 1, the two end plates 26a and 26b are fixedly fitted by press-fitting or the like around the shall 25 so as to be arranged on both sides of the rotor core 24 in the axial direction, and further, abut against both ends of the rotor core 24 in the axial direction. Recessed portions 90 that avoid the coil ends arranged toward the outside of both ends of the rotor core 24 in the axial direction are formed in the coils 28n, 28s, 30n, and 30s on one side in the axial direction of each end plate 26a and 26b. The end plates 26a and 26b are made of nonmagnetic material, and abut against the rotor core 24 at an end portion, on one side in the axial direction, of an outer peripheral end portion and an inner peripheral end portion. For example, the axial end portion of the outer peripheral portion of the each end plate 26a and 26b may also be abutted against the axial and portion of a connecting portion of each auxiliary salient pole 42. In this case, a recessed portion into which a portion at one end of each connecting pin 86 that protrudes in the axial direction beyond the rotor core 24 is inserted and retained may also be formed on an axial end portion of the outer peripheral portion of each end plate 26a and 26b. In this case, both end portions of each connecting pin 86 may also be fixed to two end plates 26a and 26b on both sides in the axial direction.

Also, the first diode 38, the second diode 40 or both of these diodes 38 and 40, may are retained in at least one end plate 26a (or 26b) of the two end plates 26a and 26b. However, this example embodiment is not limited to this kind of structure. That is, the diodes 38 and 40 need only be fixed, either directly or indirectly, to the shaft 25 or the rotor core 24. In this way, the rotor 14 is formed.

After the shaft 25 is inserted into the rotor core 24 of the rotor 14 in this way, before the rattle reducing pins 88 are inserted between adjacent core elements 54 and 56, gaps that are small finite spaces are formed between the adjacent core elements 54 and 56. Also, there is no compression stress or tensile stress generated in the adjacent core elements 54 and 56 when at least the rattle reducing pins 88 are not inserted between the adjacent core elements 54 and 56. When the rattle reducing pins 88 are pushed between the adjacent core elements 54 and 56, rattling between the adjacent core elements 54 and 56 and rattling between the shaft 25 and the rotor core 24 is able to be reduced by the rattle reducing pins 88.

Furthermore, the rattle reducing pins 88 are arranged radially inward of the widest portions 52 of the outer protruding portions 46 of the shaft 25, i.e., radially inward of the broken line G in FIG. 16 that will be described later, between core elements 54 and 56 that are adjacent in the circumferential direction.

This kind of rotor 14 includes a predetermined number each of the N-pole forming salient poles 32n and the S-pole forming salient poles 32s that are provided extending in the radial direction at a plurality of locations in the circumferential direction and around which the corresponding coils 28n and 30n (or 28s and 30s) are wound. Also, the salient poles 32n and 32s include the auxiliary salient poles 42 that are formed protruding out from the salient poles 32n on one side that are one of the second teeth between the two adjacent salient poles 32n and 32s, and the salient poles 32s on the other side that are the other of the second teeth between the two adjacent salient poles 32n and 32s. Also, in this example embodiment, the auxiliary salient poles 42 of the salient poles 32n on the one side are formed by only the first plate members 58 that are a portion of the plate members, from among the plurality of plate members 58 and 60 that form the salient poles 32n all the one side. The auxiliary salient poles 42 of the salient poles 32s on the other side are also formed by only the first plate members 58 that are a pardon of the plate members, from among the plurality of plate members 58 and 60 that form, the salient poles 32s on the other side.

The auxiliary salient poles 42 are arranged between two adjacent salient poles 32n and 32s, so as to protrude from a plurality of locations in the axial direction of both of the salient poles 32n and 32s, with intervals in the axial direction between the plurality of auxiliary salient poles 42 that protrude from the side surfaces in the circumferential direction of the salient poles 32n and 32s.

Also, the plurality of auxiliary salient poles 42 on one side, that are one example of a plurality of one-side magnetic flux inducing portions that protrude from one salient pole 32n between two adjacent salient poles 32n and 32s, and a plurality of auxiliary salient poles 42 on one side, that are one example of a plurality of other-side magnetic flux inducing portions that protrude from the other salient pole 32s between two adjacent salient poles 32n and 32s, are alternately arranged one by one in the axial direction at the tip end portions. In this case, as shown in FIG. 9, the plurality of auxiliary salient poles 42 that are alternately arranged in the axial direction at the tip end portions are connected via the connecting pins 86, and the auxiliary salient poles 42 of one salient pole 32n and the auxiliary salient poles 42 of the other salient pole 32s are alternately arranged via gaps 102 (FIG. 9) in the axial direction. That is, with the adjacent salient poles 32n and 32s, the first plate members 58 that form the auxiliary salient poles 42 and the second plate members 60 that have no auxiliary salient poles are arranged adjacent in the circumferential direction, and the second plate members 60 for forming the gaps 102 are stacked in the axial direction of two first plate members 58 that are positioned at both ends in the axial direction of the auxiliary salient poles 42.

Also, the first plate members 58 that are examples of a plurality of two-armed steel plates have the inclined protruding portions 78 that protrude from both sides in the width direction of the trunk portion 76. The second plate members 60 that are examples of a plurality of armless steel plates without arms do not have inclined protruding portions that protrude from both sides in the width direction of the middle portion in the length direction of the second trunk portion 77. Also, the salient poles 32n and 32s that have the plurality of auxiliary salient poles 42 are formed by stacked bodies that include a plurality each of the first plate members 58 and the second plate members 60. The plurality of auxiliary salient poles 42 are formed by layers of the plurality of inclined protruding portions 78 of the plurality of first plate members 58.

Figure 16:
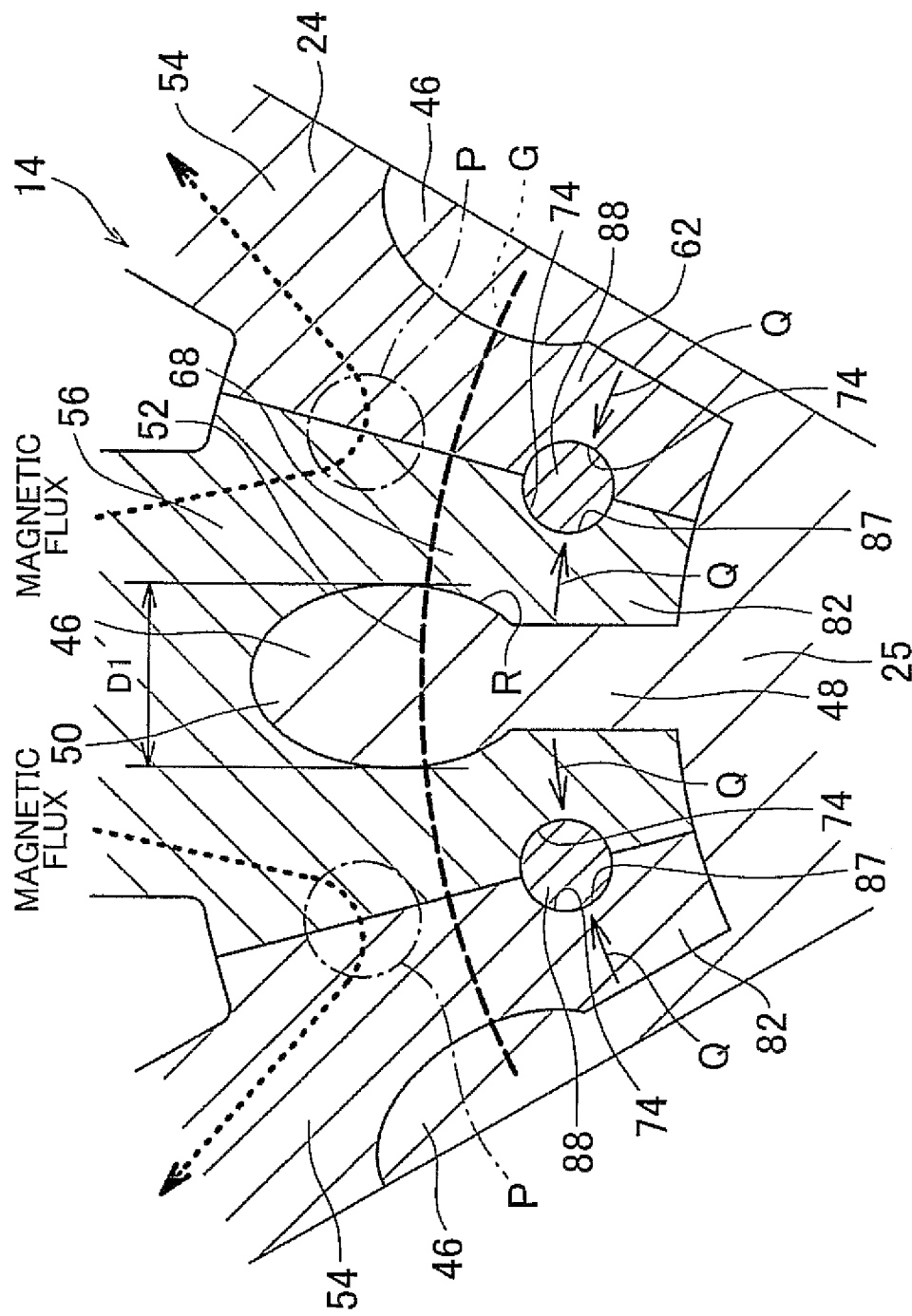
FIG. 16 is an enlarged view corresponding to portion G in FIG. 8, illustrating the flow of magnetic flux in the rotor of the first example embodiment.

According to this kind of rotor 14, the adjacent core elements 54 and 56 contact each other in the circumferential direction at the base portions, so as shown in the example in FIG. 16, most of the magnetic flux that is generated in the stator 12 and flows through the rotor 14 in the direction of the broken arrows in FIG. 16 passes only once through a gap (the round encircled portion P in FIG. 16) that is a small space between the rotor-side base portions 62 and 82 between adjacent core elements 54 and 56, without passing through the shaft 25. Therefore, magnetic resistance in the magnetic path can be reduced, so performance of the rotary electric machine 10 is able to be improved.

Further, in this example embodiment, the rotor core 24 is formed by connecting the plurality of core elements 54 and 56 together in a circle. Therefore, before the core elements 54 and 56 are connected together in a circle, the corresponding coils 28n, 28s, 30n, and 30s are able to easily be wound around the salient poles 32n and 32s, which enables the time that the winding operation takes to be shortened, and moreover, improves the space factor, i.e., the filling rate, of the coils 28n, 28s, 30n, and 30s inside the slots 34.

In particular, the salient poles 32n and 32s includes the auxiliary salient poles 42 that are formed protruding from the salient poles 32n and 32s on both sides, between two adjacent salient poles 32n and 32s. Therefore, a spatial harmonic that is a harmonic component that is interlinked to the induction coils 28n and 28s, and that is included in the rotating magnetic field generated in the stator 12, for example, a spatial second-order, i.e., a temporal third-order, harmonic component, is able to be effectively increased by the auxiliary salient poles 42. For example, most of the magnetic flux of a harmonic component of magnetomotive force distribution generated in the stator 12 is directed from the teeth 18 of the stator 12 to the salient poles 32n and 32s via the auxiliary salient poles 42, so most of the magnetic flux is able to be interlinked to the induction coils 28n and 28s. Also, most of the magnetic flux of the harmonic component is directed from the teeth 18 to the auxiliary salient poles 42 via the salient poles 32n and 32s, so most of the magnetic flux is also able to be interlinked to the induction coils 28n and 28s. Therefore, the change in the magnetic flux density of the magnetic flux that interlinks to the induction coils 28n and 28s increases, so the induction current that is directed to the induction coils 28n and 28s is able to be increased, and consequently, the magnetic force of the magnetic poles that are the electromagnets formed at the salient poles 32n and 32s is able to be increased. Accordingly, the rotor magnetic force can be increased, so the torque of the rotary electric machine 10 is able to be improved. That is, most of the magnetic flux generated in the stator 12 (FIG. 1 and the like) is able to be interlinked to the rotor coils, so the induction current generated in the rotor coils is able to be increased.

Moreover, even if the stator current that flows through the stator coils 20u, 20v, and 20w is reduced, the desired torque is still able to be obtained, so copper loss can be reduced and efficiency can be improved. As a result, the torque and efficiency of the rotary electric machine 10 are able to be improved. In this way, the auxiliary salient poles 42 that are made of magnetic material protrude directly from the side surfaces in the circumferential direction of the salient poles 32n and 32s, so the salient poles 32n and 32s are directly magnetically connected to the auxiliary salient poles 42, such that magnetic paths are formed. As a result, the interlinkage magnetic flux to the induction coils 28n and 28s is able to be increased, and consequently, the torque and efficiency of the rotary electric machine 10 are able to be improved.

Moreover, the auxiliary salient poles 42 are inclined with respect to the circumferential direction so as to become farther toward the radial outside from the base side, that is the side that is connected to the core elements 54 and 56, toward the tip end. Therefore, the necessary magnetic flux component of the spatial harmonic generated in the stator 12 is efficiently directed from the auxiliary salient poles 42 to the N-pole forming salient pole 32n or the S-pole forming salient pole 32s according to the positions of the tip end portions of the auxiliary salient poles 42, such that more magnetic flux is efficiently interlinked to the induction coils 28n and 28s that are arranged radially outward of the auxiliary salient poles 42, and consequently, the torque and efficiency of the rotary electric machine 10 are able to be improved.

Also, the auxiliary salient poles 42 of the salient pole 32n on one side, from among the adjacent salient poles 32n and 32s, are formed by only the first plate members 58 that are a portion of the plate members, from among the plurality of plate members 58 and 60 that form the salient pole 32n on one side. Also, the auxiliary salient poles 42 of the salient pole 32s on the other side are formed by only the first plate members 58 that are a portion of the plate members, from among the plurality of plate members 58 and 60 that form the salient pole 32s on the other side. Therefore, the amount of excess magnetic flux that flows through the auxiliary salient poles 42 can be minimized, while a thickness W (FIG. 11) in a direction orthogonal to the length direction of the auxiliary salient poles 42 is increased. Therefore, the strength of the auxiliary salient poles 42 is able to be more effectively improved. That is, originally, in the rotary electric machine 10, the magnetic flux that flows from the stator 12 into the rotor 14 flows between adjacent salient poles 32n and 32s via the rotor yoke 33, and then returns to the stator 12, thus generating torque. In contrast to this, when an excessive amount of magnetic flux passes through the auxiliary salient poles 42 in a case different from this example embodiment, the magnetic flux that contributes to the generation of torque impedes the flow to the salient poles 32n and 32s. In other words, more rotor current than is necessary flows through the rotor coils, which will lead to an increase in loss and a decrease in output of the rotary electric machine. Also, magnetic flux may tend to bypass (i.e., short-circuit) and leak between adjacent salient poles 32n and 32s, i.e., between NS poles, which would cause a reduction in torque.

Figure 17:
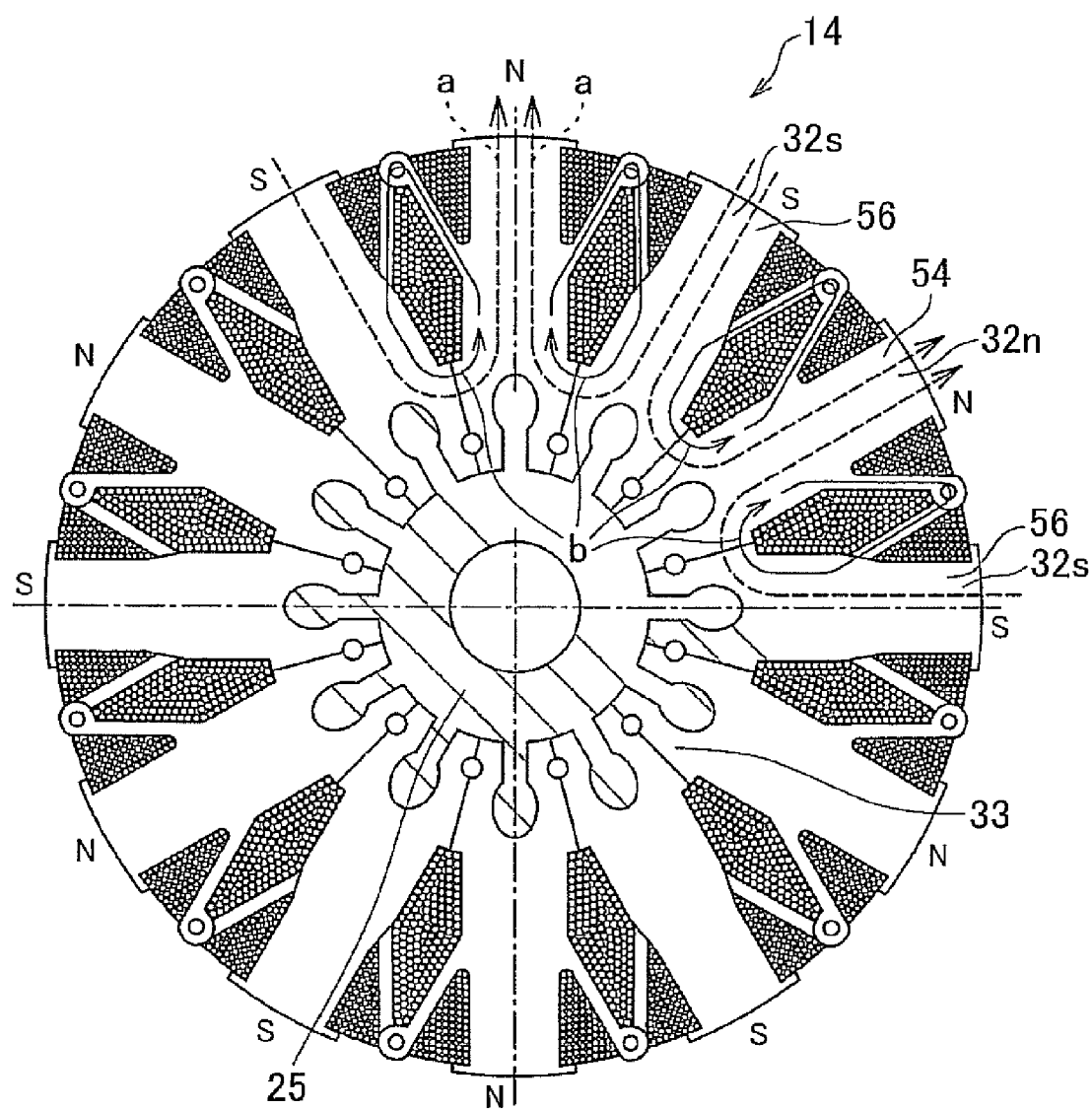
FIG. 17 is a view corresponding to FIG. 7, illustrating magnetic flux that flows through the rotor at a given moment during use in the first example embodiment, and looped magnetic flux that may be generated by a different structure than that of the first example embodiment.

FIG. 17 is a view illustrating this problem. FIG. 17 is a view corresponding to FIG. 7, illustrating magnetic flux (the broken arrows a) that flows through the rotor 14 at a given moment during use in this example embodiment, and looped magnetic flux (the solid lines b) that may be generated by a different structure than that of this example embodiment. Originally, torque is able to be generated by torque-contributing magnetic flux that is magnetic flux flowing as indicated by the broken arrows a between adjacent salient poles 32n and 32s. In contrast, when excessive magnetic flux flows to the auxiliary salient poles 42, looped magnetic flux that loops through the adjacent salient poles 32n and 32s, the auxiliary salient poles 42 thereof, and the rotor yoke 33 may be formed. In this case, there is a possibility that the original torque-contributing magnetic flux will decrease and the torque will deteriorate.

In contrast, the strength can be improved simply by making the auxiliary salient poles 42 thicker, but doing so also makes it that much easier for excessive magnetic flux to flow to the auxiliary salient poles 42. Therefore, in this example embodiment, the auxiliary salient poles 42 are formed on only a portion (i.e., some), in the axial direction, of all of the stacked plate members 58 and 60, so the amount of excess magnetic flux that flows through the auxiliary salient poles 42 can effectively be minimized while making the auxiliary salient poles 42 thicker, and thus the torque of the rotary electric machine 10 can be effectively improved.

In particular, with adjacent salient poles 32n and 32s, the auxiliary salient poles 42 of the salient pole 32n on one side that is arranged between the adjacent salient poles 32n and 32s are formed on only the first plate members 58 that make up the salient pole 32n on one side, and the auxiliary salient poles 42 of the salient pole 32s on the other side are also formed only on the first plate members 58 that make up the salient pole 32s on the other side. Therefore, unlike when the auxiliary salient poles 42 are formed on all of the plate members that make up the corresponding salient poles 32n and 32s, the length in the axial direction (i.e., the front-back direction of FIG. 11) of the auxiliary salient poles 42 is able to be reduced. Therefore, the overall thickness of the first plate members 58 that are used to form the auxiliary salient poles 42 is able to be more appropriately adjusted, while making the auxiliary salient poles 42 thicker. Therefore, the amount of excess magnetic flux that flows through the auxiliary salient poles 42 is able to be more effectively minimized, and the torque of the rotary electric machine 10 is able to be more effectively improved.

Furthermore, as shown in FIG. 9, the gaps 102 in the axial direction are formed between the tip end portions of the auxiliary salient poles 42, with the adjacent core elements 54 and 56 inside the slots 34. Accordingly, when looped magnetic flux that does not contribute to torque of the rotary electric machine 10 attempts to now to an adjacent auxiliary salient pole 42 as indicated by the broken arrow in FIG. 9, the gaps 102 becomes magnetic resistance for the looped magnetic flux, thus making it possible to more effectively inhibit a looped path for the looped magnetic flux (the solid arrows b in FIG. 17) from forming. Therefore, most of the magnetic flux that leaves the stator 12 is able to be returned to the stator 12 through the rotor 14, which more effectively enables the torque of the rotary electric machine 10 to be improved and loss to be reduced.

The stack thickness of the first plate members 58, that is the thickness in the axial direction of the auxiliary salient poles 42 formed on the salient poles 32n and 32s, is preferably the same among the auxiliary salient poles 42. Employing this structure makes it possible to make the magnetic flux uniform in the stacking direction of the plate members 58 and 60 of the salient poles 32n and 32s. Conversely, if the stack thickness of the auxiliary salient poles 42 greatly differs, such that the magnetic flux that flows at the auxiliary salient poles 42 is disproportionate, magnetic saturation occurs such that the overall amount of magnetic flux tends to decrease, which will lead to a decrease in torque and an increase in loss. The preferable structure described above is more effectively able to inhibit this kind of problem from occurring.

Further, looped magnetic flux that flows in the axial direction through adjacent auxiliary salient poles 42 is generated more easily as the thickness of the auxiliary salient poles 42 in the axial direction increases, so from the perspective of improving torque, it is better to reduce the thickness of the auxiliary salient poles 42 in the axial direction as much as possible. Also, eddy current loss will increase as a result of magnetic flux passing in the axial direction through adjacent auxiliary salient poles 42. However, assemblability tends to diminish as the thickness in the axial direction of the auxiliary salient poles 42 is reduced, i.e., as the number of first plate members 58 used in each auxiliary salient pole 42 is reduced, and the number of alternately arranged auxiliary salient poles 42 is increased. Therefore, assemblability can be effectively improved by increasing the thickness of the auxiliary salient poles 42 in a range within which the effects of magnetic saturation and eddy current loss, from magnetic flux flowing in the axial direction are not problematic.

Also, both end portions of the connecting pins 86 may also be held and fixed to the two end plates 26a and 26b, and the auxiliary salient poles 42 of adjacent salient poles 32n and 32s may be fixed together via these connecting pins 86. Also, the common coils 30n and 30s that are wound around the salient poles 32n and 32s are arranged radially inward of the corresponding auxiliary salient poles 42. According to this structure, even though centrifugal force acts on the common coils 30n and 30s when the rotor 14 rotates, the common coils 30n and 30s can be inhibited from protruding radially outward, by the adjacent auxiliary salient poles 42 that are strong because they are fixed together. Moreover, the auxiliary salient poles 42 forms a magnetic path and thus has a magnetic flux inducing function, so there is no need to provide a special fixing portion to inhibit the common coils 30n and 30s from protruding out.

Also, the first plate members 58 that are the plurality of two-armed steel plates that form the salient poles 32n and 32s each have the trunk portion 76, and the inclined protruding portions 78 that protrude from both sides in the circumferential direction of the trunk portion 76. Also, the second plate members 60 that are the plurality of armless steel plates that form the salient poles 32n and 32s do not have inclined protruding portions that protrude from both sides in the width direction of the middle portion in the length direction of the second trunk portion 77. Also, each of the salient poles 32n and 32s that have the plurality of auxiliary salient poles 42 is formed by a stacked body that includes a plurality each of the first plate members 58 and the second plate members 60, and the auxiliary salient poles 42 are formed by a plurality of inclined protruding portions 78 of the first plate members 58. Therefore, when the rotor 14 rotates, the centrifugal force applied to the auxiliary salient poles 42 and the force applied to the auxiliary salient poles 42 by the centrifugal force from the salient poles 32n and 32s to the inside of the auxiliary salient poles 42 act bilaterally symmetrically, i.e., act symmetrically with respect to the center in the circumferential direction, in the auxiliary salient poles 42 on both sides in the circumferential direction of the core elements 54 and 56. Therefore, a bending moment that acts to incline the core elements 54 and 56 with respect to the circumferential direction can be inhibited from being generated, which enables durability to be improved, and enables the width of the auxiliary salient poles 42 to be reduced while ensuring strength.

Figure 18:
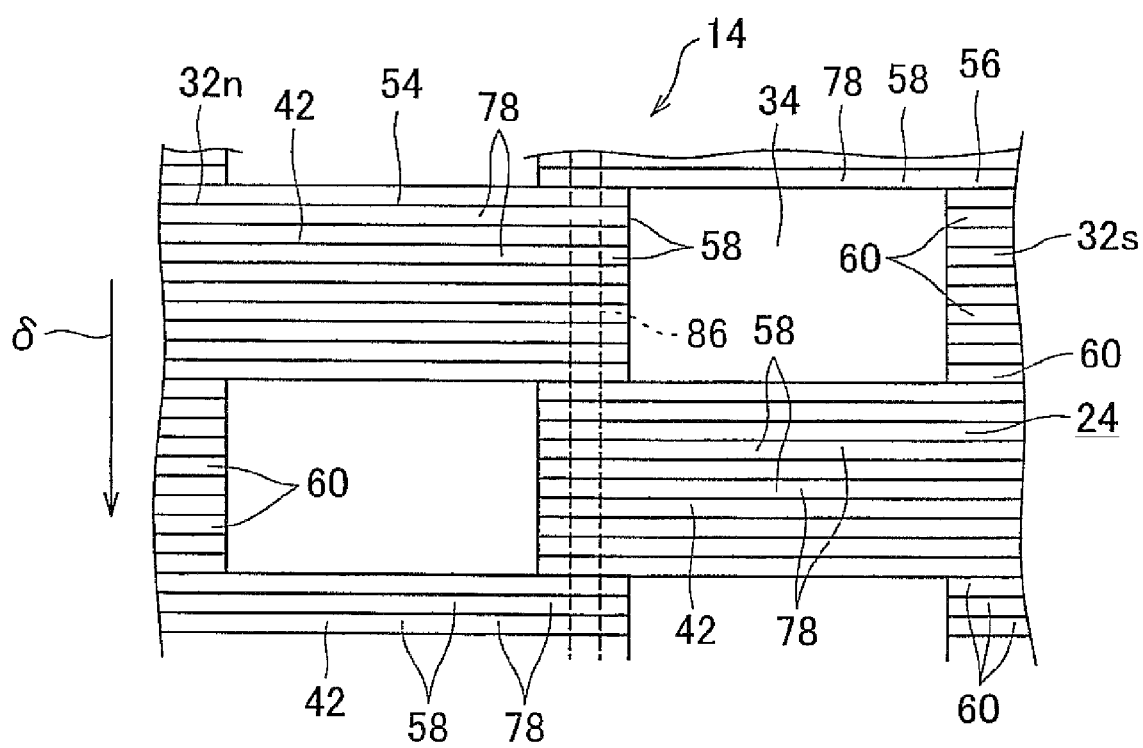
FIG. 18 is a view corresponding to FIG. 9 of another example of an arrangement of a plurality of plate members in the first example embodiment.

The positional relationship and number of layers of the first plate members 58 and the second plate members 60 are not limited to those illustrated in FIG. 9 and the like described above. For example, FIG. 18 is a view corresponding to FIG. 9, of another example of the arrangement of a plurality of plate members in the first example embodiment. In this other example in FIG. 18, the number of layers of first plate members 58 is the same as the number of layers of the second plate members 60 in the core elements 54 and 56, and the tip end portions of the inclined protruding portions 78 of the first plate members 58 contact each other in the axial direction. Also, the auxiliary salient poles 42 are formed by the stacked pardons of the inclined protruding portions 78. That is, the tip end portions of the auxiliary salient poles 42 of adjacent salient poles 32n and 32s are stacked alternately in the axial direction, and connected via the connecting pins 86. Also, just as in the example embodiment described above, both end portions of the connecting pins 86 may also be held and fixed to the two end plates 26a and 26b (see FIG. 1), and the auxiliary salient poles 42 of adjacent salient poles 32n and 32s may be fixed together via these connecting pins 86. Also, the common coils 30n and 30s that are wound around the salient poles 32n and 32s are arranged radially inward of the corresponding auxiliary salient poles 42. With this structure, the fixing strength of adjacent auxiliary salient poles 42 is able to be even greater.

In the other example shown in FIG. 18, unlike with the structure shown in FIG. 9, the gaps 102 (FIG. 9) are not formed between axially adjacent auxiliary salient poles 42. Therefore, a looped path (the solid arrows b in FIG. 17) where magnetic flux that does not contribute to torque of the rotary electric machine loops via the auxiliary salient poles 42 and the rotor yoke 33 (see FIG. 17) tends to form between adjacent salient poles 32n and 32s via the auxiliary salient poles 42. Therefore, in the other example shown in FIG. 18, the effect of reducing loss and improving torque of the rotary electric machine is not as good as it is with the structure shown in FIG. 9. However, with the other example shown in FIG. 18, even if the magnetic flux tends to form a looped path, magnetic flux needs to flow in the axial direction in adjacent auxiliary salient poles 42, and the magnetic resistance will increase, so a looped path will not form as easily as it will with a structure that connects circumferentially adjacent auxiliary salient poles 42 together in axially the same position. Therefore, with the other example shown in FIG. 18 as well, the effects of improved torque and reduced loss are able to be obtained. With the other example in FIG. 18 the auxiliary salient poles 42 are connected by the connecting pins 86, but the invention is not limited to a structure that uses these kinds of connecting pins 86. For example, protruding portions on one axial side and recessed pardons on the other axial side may be formed on the tip end portions of the auxiliary salient poles 42 by press-forming or the like, i.e., concavo-convex processing that is referred to as dowel crimping, and the tip end portions of adjacent auxiliary salient poles 42 may be fixed together, with the protruding portions fitted into the recessed portions. In this case, the connecting pins 86 may be omitted.

In the example embodiment described in FIGS. 1 to 18, both end portions of the connecting pins 86 do not have to be fixed to the two end plates 26a and 26b, but fixing the connecting pins 86 to the two end plates 26a and 26b makes it possible to effectively ensure the strength of the auxiliary salient poles 42 against centrifugal force when the rotor 14 rotates. Also, one or both of the connecting pins 86 and the rattle reducing pin 88 may also be made of nonmagnetic material such as resin, or stainless material such as nonmagnetic stainless material. By forming the connecting pins 86 and the rattle reducing pin 88 out of nonmagnetic material, magnetic flux will not pass through the pins 86 and 88, so loss such as eddy current loss will not increase. Also, making the connecting pins 86 out of nonmagnetic material such as resin makes it possible to even more effectively inhibit looped magnetic flux from flowing between adjacent auxiliary salient poles 42 via the connecting pins 86. Also, arranging the coil ends in the recessed portions 90 (FIG. 1) of the end plates 26a and 26b and arranging the coil ends radially inward of the outer peripheral end portions of the end plates 26a and 26b enables the retaining strength of the coils 28n, 28s, 30n, and 30s against the centrifugal force to be improved.

Although not shown, the first plate members 58 and the second plate members 60 may also be arranged alternately one by one in the first core elements 54, and the first plate members 58 and the second plate members 60 may also be arranged alternately one by one in the second core elements 56 such that the first plate members 58 are not next to each other in the circumferential direction. In this case, the tip end portions of the inclined protruding portions 78 that will become the auxiliary salient poles 42 are alternately arranged in the axial direction, and alternately stacked, with the first core elements 54 and the second core elements 56. In this case as well, the tip end portions of the auxiliary salient poles 42 may be fixed by connecting pins, or concavo-convex processing that is referred to as dowel crimping described above may be performed on the tip end portions of the auxiliary salient poles 42.

Also, in the example embodiment described above, a case is described in which all of the first plate members 58 and the second plate members 60, including the inclined protruding portions 78 that form the auxiliary salient poles 42, are formed by steel plates that are magnetic, such as magnetic steel plates. However, instead of the inclined protruding portions 78 on circumferentially one side or circumferentially the other side of the first plate members 58, auxiliary protruding plate portions made of nonmagnetic material that is resin or nonmagnetic metal may be made to protrude from the side surfaces in the circumferential direction of the first plate members 58. In this case as well, the common coils 30n and 30s may be arranged to the inside of auxiliary protruding portions formed by the auxiliary protruding plate portions that are adjacent and connected together in the slots 34, such that the common coils 30n and 30s can be inhibited from coming off.

In the first example embodiment described above, the connecting pins 86 and the pin holes 85 (see FIG. 8 and the like) may also be omitted, and a structure may be employed that makes magnetic flux inductive plate portions of the same length on both sides in the width direction of the first plate members 58 that form the salient poles 32*n* and 32*s* protrude in a direction inclined with respect to the circumferential direction such that they become farther toward the radial outside toward the tip ends. In this case, one or a stacked body of each of the first plate members 58 and the second plate members 60 are arranged alternately in the axial direction in the salient poles 32*n* and 32*s*, such that the first plate members 58 are arranged in a plurality of locations that become the same positions in the axial direction with two adjacent salient poles 32*n* and 32*s*. In this case, the tip ends of the magnetic flux inductive plate portions of the first plate members 58 with two adjacent salient poles 32*n* and 32*s* are made to face each other via gaps, or made to face each other so as to contact each other. With this structure as well, auxiliary salient poles that are an example of magnetic flux inducing portions are formed by only one or a stacked portion of the magnetic flux inductive plate portions of the first plate members 58 that are a portion of the plate members, from among the plurality of plate members 58 and 60 that form the salient poles 32*n* and 32*s*.

Second Example Embodiment

Figure 19:
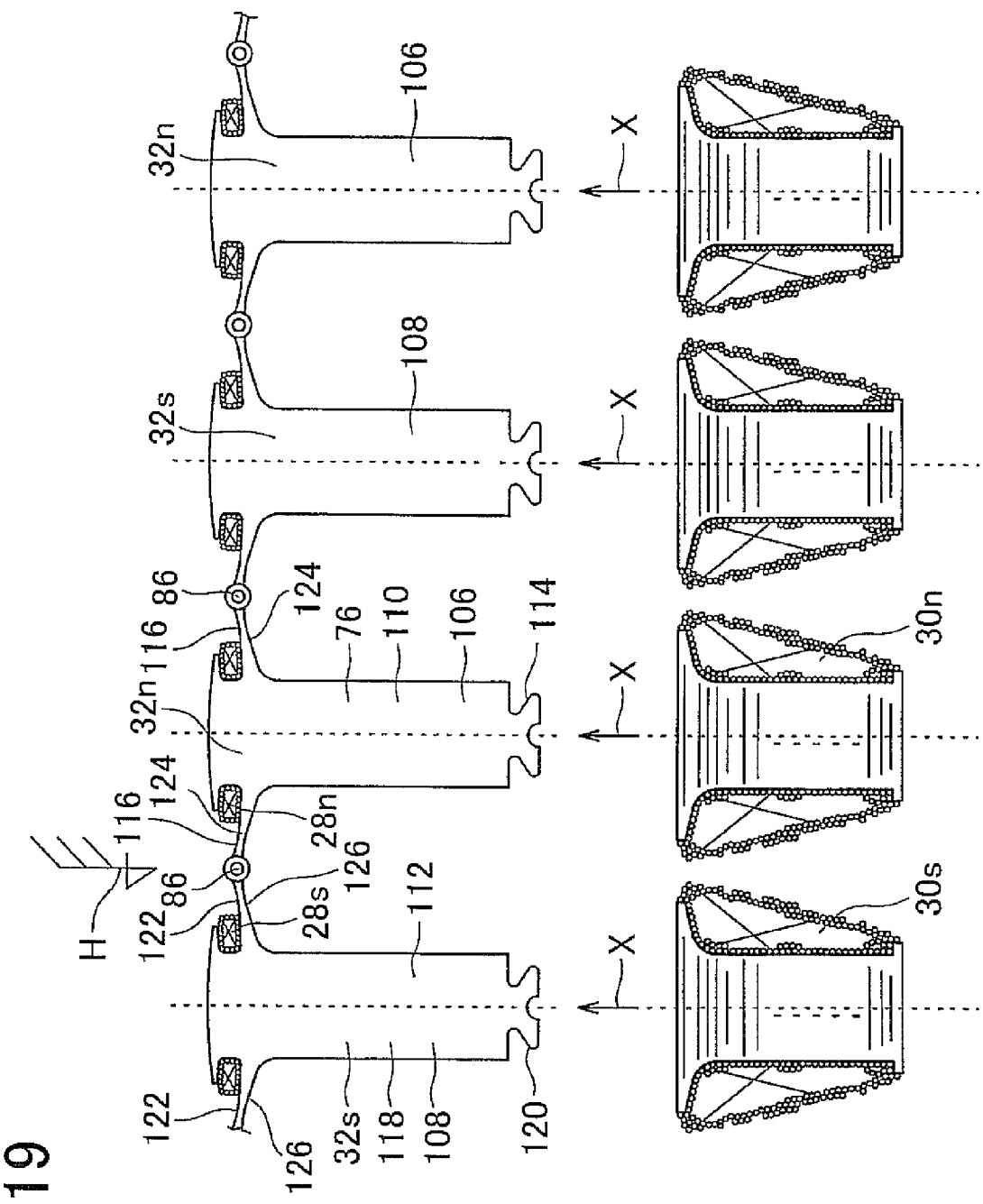
FIG. 19 is a view of a rotor according to a second example embodiment of the invention midway through a manufacturing process, and shows a plurality of common coils being fitted to a plurality of core elements around which a plurality of induction coils are wound, while the plurality of core elements are extended in a linear fashion and connected together.
Figure 20:
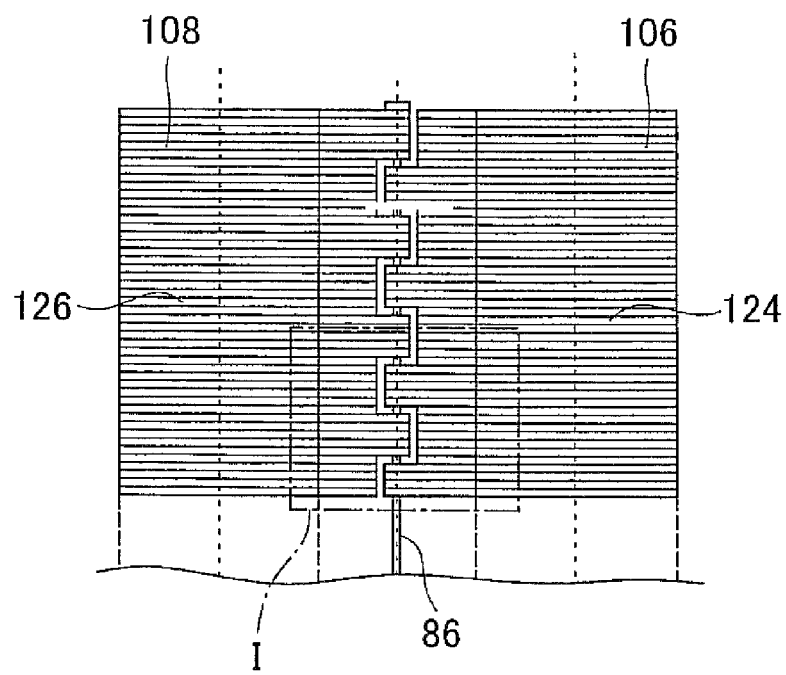
FIG. 20 is a view of an axial portion (i.e., a portion in the axial direction) when two core elements are viewed from the direction of arrow H in FIG. 19.
Figure 21:
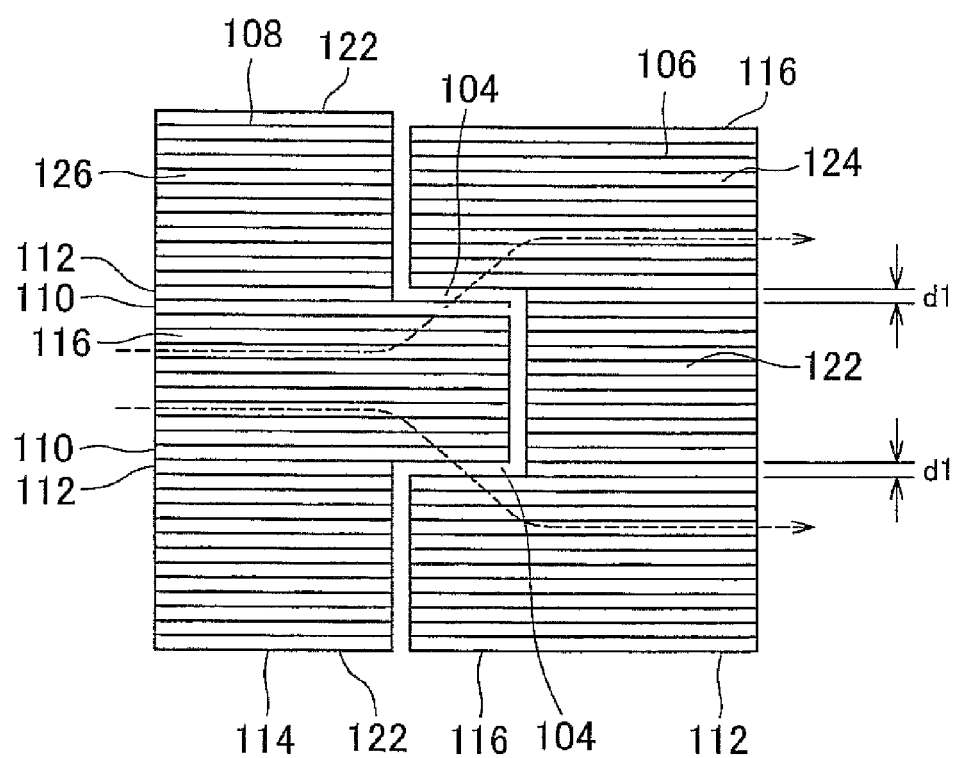
FIG. 21 is an enlarged view of portion I in FIG. 20, with a portion omitted.

FIG. 19 is a view of a rotor according to a second example embodiment of the invention midway through the manufacturing process, and shows a plurality of common coils being fitted to a plurality of core elements around which a plurality of induction coils are wound, while the plurality of core elements are extended in a linear fashion and connected together. FIG. 20 is a view of an axial portion when two core elements are viewed from the direction of arrow H in FIG. 19. FIG. 21 is an enlarged view of portion I in FIG. 20, with a portion omitted.

In this second example embodiment, a rotor, not shown, is provided with first core elements 106 and second core elements 108 that are arranged alternately in the circumferential direction, and a shaft, not shown, that is fixedly fitted in the axial direction to the inside of the plurality of core elements 106 and 108. Recessed portions that pass through both ends in the axial direction are formed in a plurality of locations hi the circumferential direction of the outer peripheral surface of the shaft. The core elements 106 and 108 are formed by alternately stacking, a plurality at a time, first plate members 110 that are magnetic steel plates as well as two-armed steel plates, and second plate members 112 that are magnetic steel plates as well as second two-armed steel plates. The first plate members 110 each have a trunk portion 76 and a base portion 114 on the side of the trunk portion 76 that connects to the shaft, similar to the first plate members 58 used in the first example embodiment described above. The base portion 114 is able to fit in the axial direction into the corresponding recessed portion on the outer peripheral surface of the shaft. A first inclined protruding portion 116 that is one example of a first magnetic flux inductive plate portion or a third magnetic flux inductive plate portion is made to protrude in a direction inclined with respect to the circumferential direction of the rotor, from both side surfaces in the width direction of a middle portion in the length direction of the trunk portion 76. A pin hole into which a connecting pin 86 can be inserted is formed in the tip end portion of each inclined protruding portion 116.

The second plate members 112 have a second trunk portion 118 and a second base portion 120 that are the same shapes as the trunk portion 76 and the base portion 114 of the first plate members 110, respectively, described above. Second inclined protruding portions 122 that are examples of second magnetic flux inductive plate portions or fourth magnetic flux inductive plate portions are formed protruding from both side surfaces in the circumferential direction of the middle portion in the length direction of the second trunk portion 118. However, the second inclined protruding portions 122 are shorter than the first inclined protruding portions 116, and the tip end portions of the second inclined protruding portions 122 are facing, via a small gap, the first inclined protruding portions 116 of the first plate members 110, when the first plate members 110 and the second, plate members 112 are arranged in the same positions in the axial direction of the rotor. Pin holes are not formed in the tip end portions of the second inclined protruding portions 122. A plurality each of the first plate members 110 and the second plate members 112 are stacked together alternately to form both the first core elements 106 and the second core elements 108. As shown in FIG. 21, with the first core elements 106 and the second core elements 108, the first plate members 110 in the same positions in the axial direction are not next to each other in the circumferential direction. Also, the number of layers of the first plate members 110 is less than the number of layers of the second plate members 112. The stacked trunk portions 76 of the first core elements 106 form the N-pole forming salient poles 32*n* and the stacked second trunk portions 118 of the second core elements 108 form the S-pole forming salient poles 32*s*.

When forming the rotor, as shown in FIGS. 19 to 21, the first core elements 106 and the second core elements 108 are arranged lined up in a linear fashion alternately one by one, and the connecting pins 86 are inserted into the pin holes that are aligned in the axial direction with adjacent care elements 106 and 108. In this state, the corresponding induction coils 28*n* and 28*s* and common coils 30*n* and 30*s* are wound around the core elements 106 and 108. In this case, the corresponding common coils 30*n* and 30*s* are fitted from the base side toward the trunk portions 76 and 118 of the core elements 106 and 108, as indicated by the arrows X in FIG. 19. Also, the plurality of cote elements 106 and 108 are arranged in a circle while pivoting adjacent core elements 106 and 108 about the connecting pins 86, and a connecting pin 86 is inserted into the pin hole that is aligned in the axial direction of the two core elements 106 and 108 positioned on both ends, thereby forming the rotor core that is connected in a circle. The rotor is formed by fitting the shaft in the axial direction, while fitting the base portions 114 and 120 of the core elements into the recessed portions of the shaft, at the center portion of the rotor core. First auxiliary salient poles 124 that are one example of one-side magnetic flux inducing portions that are long in the axial direction are formed by stacked 110 portions of the first inclined protruding portions 116 and the second inclined protruding portions 122 of the first core elements 106. Also, second auxiliary salient poles 126 that are one example of other-side magnetic flux inducing portions that are long in the axial direction are formed, by stacked portions of the first inclined protruding portions 116 and the second inclined protruding portions 122 of the second core elements 108. Also, the first inclined protruding portions 116 of the first auxiliary salient poles 124 and the first inclined protruding portions 116 of the second auxiliary salient poles 126 are arranged facing each other and offset in the axial direction.

As shown in FIG. 21, a plurality of the auxiliary salient poles 124 and 126 that are arranged alternately in the axial direction at the tip end portions are connected together via the connecting pins 86, and the auxiliary salient poles 124 on one salient pole 32*n* side and the auxiliary salient poles 126 on the other salient pole 32s side are arranged alternately across a gap 104 (FIG. 21) in the axial direction that has a thickness d1. That is, with adjacent core elements 106 and 108, the first plate, members 410 that form the auxiliary salient poles 124 and 126 are arranged so as to be next to, in the circumferential direction, the second plate members 112 that have no auxiliary salient poles. The second plate members 112 for forming the gap 104 are stacked in the axial direction together with two first plate members 110 that are positioned one on each end in the axial direction of the stacked first inclined protruding portions 116 of the auxiliary salient poles 124 and 126.

With this kind of rotor, the first inclined protruding portions 116 (or 122) are formed on both sides in the circumferential direction of all of the first plate members 110 (or 112), of the plurality of first plate members 110 (or 112) that form the salient poles 32n and 32s. Also, the salient poles 32n and 32s include the auxiliary salient poles 124 and 126 that are formed between two adjacent salient poles 32n and 32s and protruding from the salient poles 32n and 32s on both sides. Also, the plurality of salient poles 32n and 32s includes the first auxiliary salient poles 124 formed by the plurality of first plate members 110 and second plate members 112 that form one salient pole 32n, of two adjacent salient, poles 32n and 32s, and the second auxiliary salient poles 126 formed by the plurality of first plate members 110 and second plate members 112 that form the other salient pole 32s, of two adjacent salient poles 32n and 32s. Therefore, most of the magnetic flux of the harmonic component of the magnetomotive force distribution generated in the stator 12 (see FIG. 2 and the like) is directed from the teeth 18 of the stator 12 (see FIG. 2 and the like) to the salient poles 32n and 32s via the auxiliary salient poles 124 and 126, so most of the magnetic flux is able to be interlinked to the induction coils 28n and 28s. Also, most of the magnetic flux of the harmonic component is directed from the teeth 18 to the auxiliary salient poles 124 and 126 via the teeth 18, so most of the magnetic flux is able to be interlinked to the induction coils 28n and 28s. Therefore, most of the magnetic flux generated in the stator 12 is interlinked to the induction coils 28n and 28s, so the induction current generated in the induction coils 28n and 28s is able to be increased. As a result, the rotor magnetic force is able to be increased, so the torque of the rotary electric machine is able to be improved.

Also, one of the auxiliary salient poles 124 formed on one of the salient poles 32n, of adjacent salient poles 32n and 32s, and the other auxiliary salient poles 126 formed on the other of the salient poles 32s are arranged alternately in the axial direction via the gap 104. Therefore, when looped magnetic flux attempts to pass between the auxiliary salient poles 124 and 126, as shown by the broken arrows in FIG. 21, the magnetic resistance will increase, so looped magnetic flux can be inhibited from occurring, and thus loss can be reduced and torque of the rotary electric machine can be improved. In this example embodiment as well, just as in the first example embodiment, the second plate members 112 for forming the gap 104 may be omitted, and the auxiliary salient poles 42 formed between adjacent salient poles 32n and 32s may be stacked together alternately in the axial direction at the tip end portions. The other structure and operation is the same as that in the first example embodiment described above.

Third Example Embodiment

Figure 22:
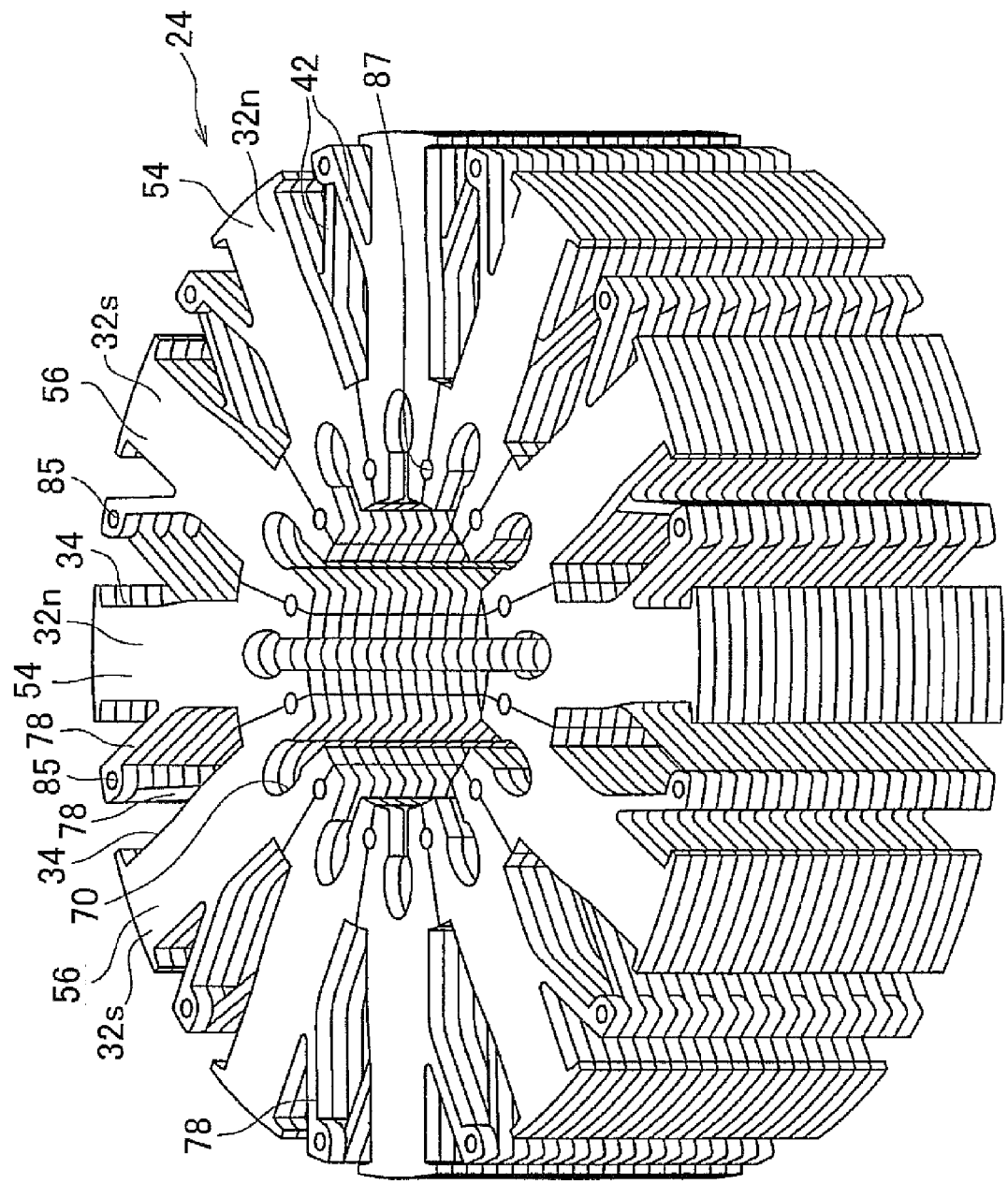
FIG. 22 is a perspective view of a rotor core that forms a rotor according to a third example embodiment of the invention.
Figure 23:
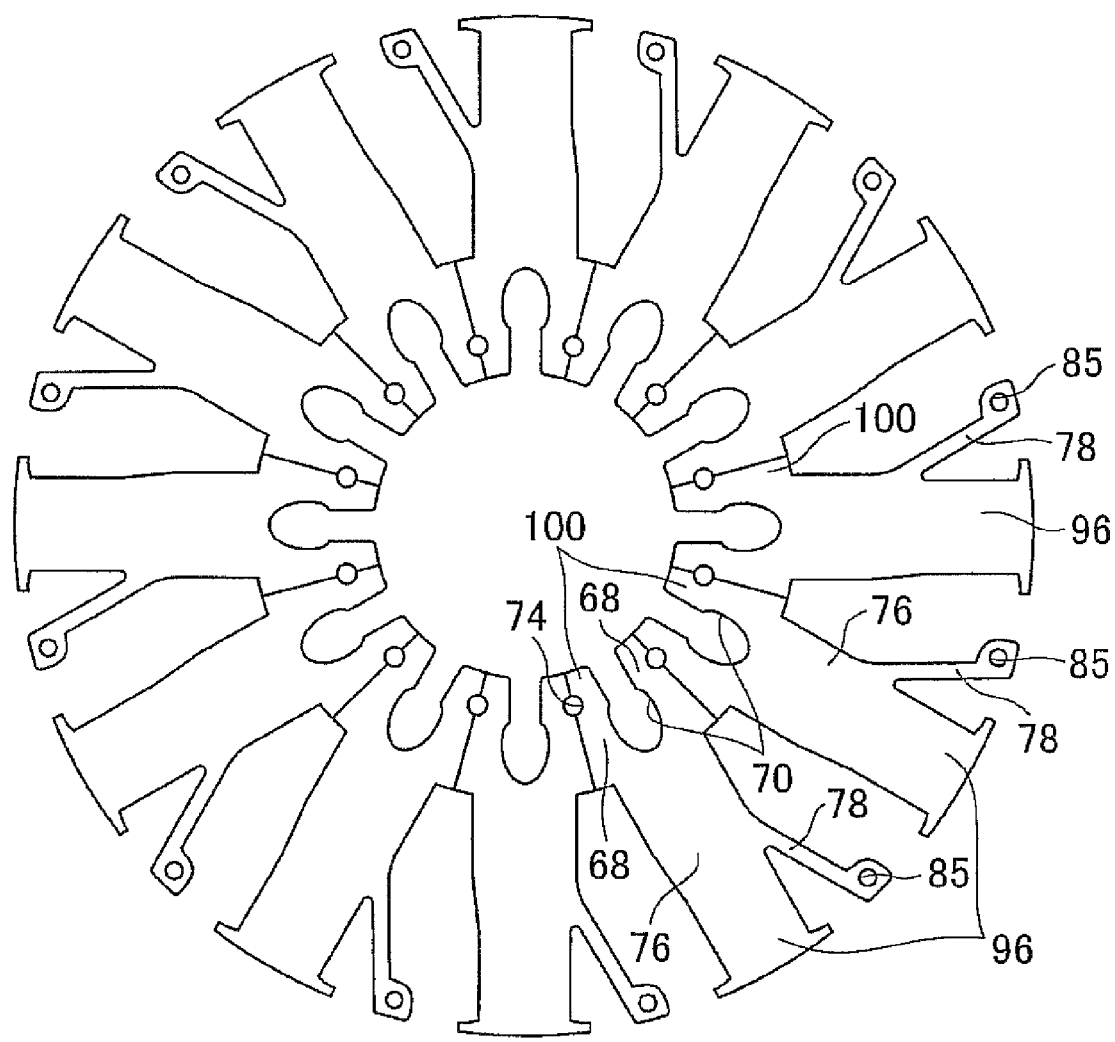
FIG. 23 is a view of a plurality of first plate members that form an axial portion of the rotor core in FIG. 22.
Figure 25:
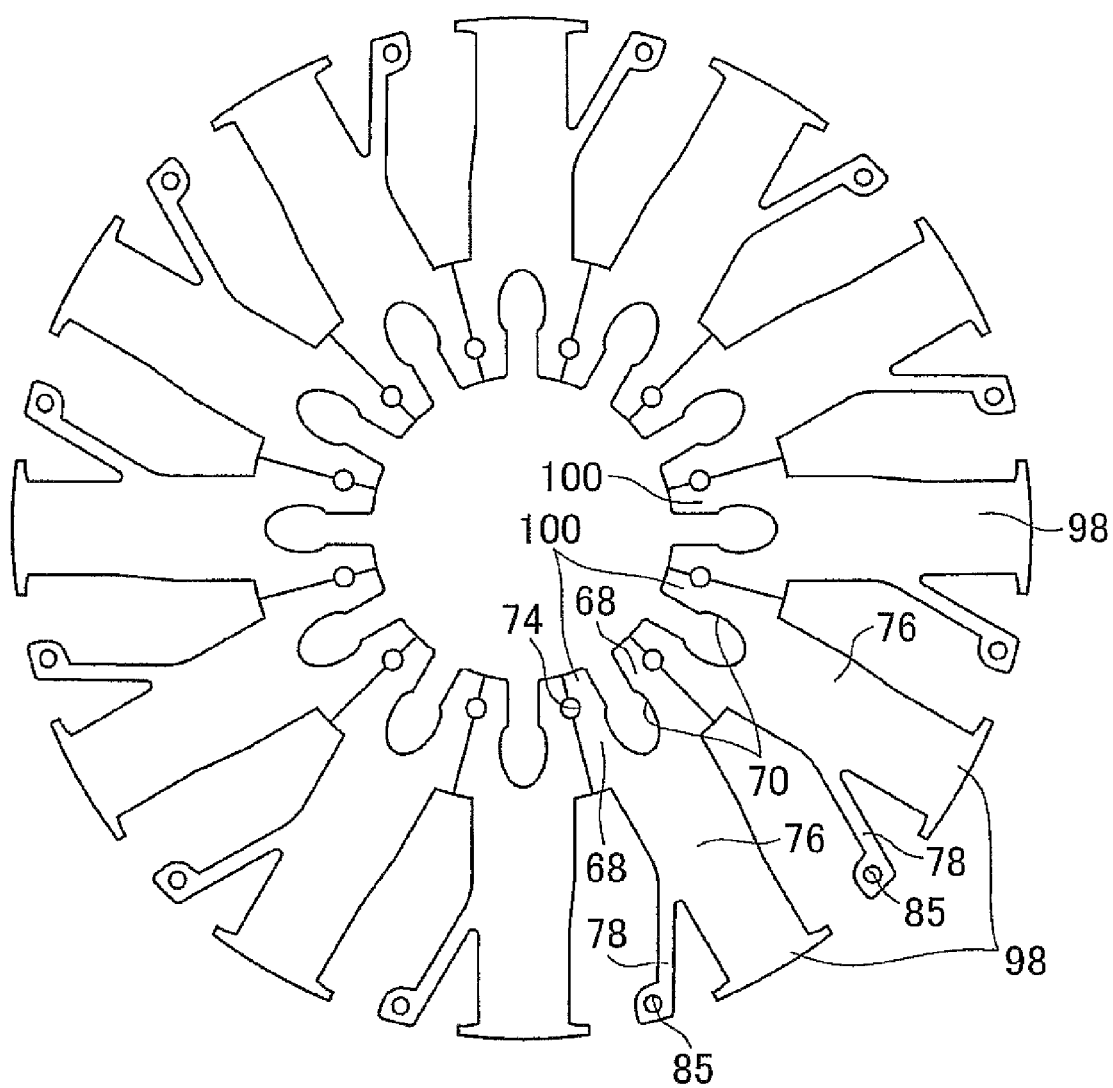
FIG. 25 is a view of a plurality of third plate members that form an axial portion of the rotor core in FIG. 22.

FIG. 22 is a perspective view of a rotor core 24 that forms a rotor according to a third example embodiment of the invention. FIG. 23 is a view of a plurality of first plate members 96 that form an axial portion (i.e., a portion in the axial direction) of the rotor core 24 in FIG. 22. FIG. 24 is a view of a plurality of second plate members 60 that form an axial portion of the rotor core 24 in FIG. 22. FIG. 25 is a view of a plurality of third plate members 98 that form an axial portion of the rotor core 24 in FIG. 22, As shown in FIG. 22, with the rotor core 24 that forms the rotor of this example embodiment, the first plate members 58 (see FIGS. 8 and 13 and the like) having the inclined protruding portions 78 on both sides, that are used in the first example embodiment shown in FIGS. 1 to 17 described above are not used. That is, the rotor core 24 is formed by a plurality of first plate members 96 shown in FIG. 23, a plurality of second plate members 60 shown in FIG. 24, and a plurality of third plate members 98 shown in FIG. 25. The first plate members 96 in FIG. 23 that are one-armed steel plates are such that the inclined protruding portions 78 protrude from only one side surface in the circumferential direction of the trunk, portion 76, in contrast to the first plate members 58 described above. The third plate members 98 in FIG. 25 that are second one-armed steel plates are such that the inclined protruding portions 78 protrude from only the other side surface in the circumferential direction of the trunk portion 76, in contrast to the first plate members 58 described above. In contrast, the second plate members 60 in FIG. 24 that are an example of aimless steel plates have the same shape as the second plate members 60 that are used in the first example embodiment described above.

The rotor core 24 in FIG. 22 includes first core elements 54 and second core elements 56 that are each a plurality of rotor core elements. The rotor core 24 is formed by arranging alternately the first core elements 54 that have N-pole forming salient poles 32n and the second core elements 56 that have S-pole forming salient poles 32s, alternately one by one, in the circumferential direction and connecting them together in a circle. Each of the core elements 54 and 56 is formed by stacking one each of the first plate members 96, the second plate members 60, and the third plate members 98 together in that order and repeating this, or by stacking a plurality of the first plate members 96, a plurality of the second plate members 60, and a plurality of the third plate members 98 together in that order and repeating this. In this case, the plate members 96, 60, and 98 that are arranged in the same positions in the axial direction in the core elements 54 and 56 are the same type in both core elements 54 and 56. Also, the stacked bodies of the plate members 96, 60, and 98 are arranged in a circle, and the side surfaces in the circumferential direction of rotor-side base portions 100 of adjacent stacked bodies are made to contact one another in the circumferential direction. Further, the tip end portions of the inclined protruding portions 78 of adjacent core elements 54 and 56 arranged in the slots 34 (FIG. 22) are arranged overlapping when viewed from the axial direction, and the pin holes 85 are aligned with each other. Accordingly, the rotor core 24 is formed. With the rotor core 24, the first core elements 54 and the second core elements 56 are arranged alternately in the circumferential direction.

With the rotor, not shown, the N-pole induction coil 28n and the N-pole common coil 30n (see FIG. 8 and the like) are wound around the first core elements 54, and the S-pole induction coil 28s and the S-pole common coil 30s (see FIG. 8 and the like) are wound around the second core elements 56. The connecting pins 86 (see FIG. 8 and the like) are inserted into the aligned pin holes 85 of the first core elements 54 and the second core elements 56 that are adjacent to each other. Also, the shaft 25 is fitted to the rotor core 24 such that the outer protruding portions 46 of the shaft 25 (see FIG. 8 and the like) fit in the axial direction into the inner recessed portions 70 of the core elements 54 and 56. In this state, the rattle reducing pins 88 (see FIG. 8 and the like) are inserted in the axial direction, so as to spread the leg portions 68 apart, into the generally circular pin engaging portions 87 formed in the semicircular portions 74 of the side surfaces in the circumferential direction of the rotor-side base portions 100 of adjacent core elements 54 and 56.

Also, the first plate members 96 that are one example of a plurality of one-armed steel plates each have the trunk portion 76, and the inclined protruding portion 78 that protrudes from one side in the width direction of the trunk portion 76. The second plate members 60 that are one example of a plurality of armless steel plates each have the second trunk portion 77 that is the same shape as the trunk portion 76, but do not have an inclined protruding portion that protrudes from one side in the width direction of the middle portion in the length direction of the second trunk portion 77. The salient poles 32n and 32s that have the plurality of auxiliary salient poles 42 are each formed by a stacked body that includes a plurality each of the first plate members 96 and the second plate members 60. Of the plurality of auxiliary salient poles 42, the auxiliary salient poles 42 on one side in the circumferential direction are formed by a plurality of inclined protruding portions 78 of the plurality of first plate members 96. Also, of the plurality of auxiliary salient poles 42, the auxiliary salient poles 42 on the other side in the circumferential direction are formed by a plurality of inclined protruding portions 78 of the plurality of third plate members 98. That is, the plurality of auxiliary salient poles 42 is formed by layers of a plurality of inclined protruding portions 78 of the plurality of first plate members 96, and layers of a plurality of inclined protruding portions 78 of the plurality of third plate members 98.

In this kind of rotor as well, similar to the first example embodiment described above, with adjacent salient poles 32n and 32s, the auxiliary salient poles 42 of the salient pole 32n on one side that are arranged between adjacent salient poles 32n and 32s are formed by only the first plate members 96 and the third plate members 98 that form the salient pole 32n on one side, and the auxiliary salient poles 42 of the salient pole 32s on the other side is also formed by only the first plate members 96 and the third plate members 98 that form the salient pole 32s on the other side. Thus, the length of the auxiliary salient poles 42 in the axial direction (i.e., the front-back direction in FIG. 22) can be reduced. Therefore, the auxiliary salient poles 42 are formed on only a portion, in the axial direction, of the all of the stacked plate members 96, 60, and 98, so the amount of excess magnetic flux that passes through the auxiliary salient poles 42 can be more effectively reduced, such that the torque of the rotary electric machine can be more effectively improved, while making the auxiliary salient poles 42 thicker.

Also, the salient poles 32n and 32s are each formed by a stacked body that includes the first plate members 96 that are one example of a plurality of one-armed steel plates and the second plate members 60 that are one example of armless steel plates. Of the plurality of auxiliary salient poles 42, the auxiliary salient poles 42 on one side in the circumferential direction are formed by a plurality of the inclined protruding portions 78 of the plurality of first plate members 96. Also, of the plurality of auxiliary salient poles 42, the auxiliary salient poles 42 on the other side in the circumferential direction are funned by a plurality of the inclined protruding portions 78 of the plurality of third plate members 98. Thus, in the salient poles 32n and 32s, with the first plate members 96 or the third plate members 98, magnetic flux that leaks out from the stator to the slots 34 flows into the salient poles 32n and 32s via the inclined protruding portions 78 of only the one side or the other side. Therefore, compared with a case in which there are inclined protruding portions 78 on both sides of the first plate members 96 and the third plate members 98, the amount of magnetic flux that passes through the auxiliary salient poles 42 can be reduced, so magnetic saturation will not occur as easily at the salient poles 32n and 32s. As a result, the torque of the rotary electric machine can be improved. The other structure and operation is the same as that in the first example embodiment described above.

In this example embodiment, the first plate members 96 and the third plate members 98 may be formed by one type of metal plates that are the same shape, and the first plate members 96 and the third plate members 98 may be distinguished by reversing the fronts and hacks. Also, in the rotor core 24, the second plate members 60 may also be omitted. For example, and the rotor core may be formed by forming a plurality of stacked bodies by alternately stacking the first plate members 96 and the third plate members 98 one by one or a plurality at a time, and then connecting the plurality of these stacked bodies together in a circle. Also, as another example of a rotor, a structure may also be employed in which core elements are formed by stacked bodies that include only two types of plate members, i.e., the first plate members 96 that are one example of one-armed steel plates having the inclined protruding portions 78 on only one side, and the second plate members 60 that are one example of armless steel plates, and the auxiliary salient poles 42 protrude from only one side in the circumferential direction of the salient poles.

In the example embodiments described above, the induction coils 28n and 28s and the common coils 30n and 30s that are separated by the auxiliary salient poles 42 are wound around the salient poles 32n and 32s. However, the invention is not limited to this. For example, a single coil may be wound around each of the salient poles 32n and 32s, and both ends of each coil may be short-circuited by a diode with a different forward direction in adjacent coils, and N-poles and S-poles may be alternately formed at the tip ends of a plurality of salient poles 32n and 32s that are arranged in a plurality of locations in the circumferential direction, by induction current flowing through the coils. Also, in the example embodiments described above, the auxiliary salient poles that are one example of the magnetic flux inducing portion protrude from the salient poles 32n and 32s that are teeth, in a direction inclined with respect to the circumferential direction of the rotor. However, the invention is not limited to this. For example, a portion of the magnetic flux inducing portion may also have a curved shape.

While the invention has been described with reference to example embodiments thereof, it is to be understood that the invention is not in any way limited to the described embodiments. To the contrary, the invention may also be carried out in any one of various modes within the scope of the invention.

What is claimed is:
1. A rotor for a rotary electric machine, comprising:
a rotor core; and
a plurality of teeth, each of which is formed by a plurality of plate members including steel plates that are stacked together, and around which a rotor coil is wound, each of the plurality of teeth including a trunk portion extending in a radial direction from the rotor core, at least a portion of the plurality of teeth including a magnetic flux inducing section, the magnetic flux inducing section protruding between trunk portions of two of the teeth that are adjacent to one another, from at least a portion of a plurality of plate members that form at least one of the two teeth that are adjacent to one another, and the magnetic flux inducing section being formed by the plate members, a portion of the rotor coil is wound around the plurality of teeth in a position farther toward a radial distal end of the plurality of teeth than the magnetic flux inducing section, wherein the magnetic flux inducing section is a plurality of magnetic flux inducing portions that includes a plurality of one-side magnetic flux inducing portions that protrude from a plurality of locations in an axial direction of the trunk portion of one of the two teeth that are adjacent to one another, and a plurality of other-side magnetic flux inducing portions that protrude from a plurality of locations in the axial direction of the trunk portion of the other of the two teeth that are adjacent to one another, wherein the one-side magnetic flux inducing portions and the other-side magnetic flux inducing portions are fixed together.

2. The rotor according to claim 1, wherein the one-side magnetic flux inducing portions and the other-side magnetic flux inducing portions are fixed together directly, or indirectly via a connecting pin, and wherein each of the plurality of magnetic flux inducing portions protrude between the trunk portions of the two teeth that are adjacent to one another, the magnetic flux inducing portions protrude from a plurality of locations of at least one of the teeth in an axial direction of the rotor core, and the magnetic flux inducing portions are arranged with a gap in the axial direction of the rotor core.

3. The rotor according to claim 1, wherein the one-side magnetic flux inducing portions and the other-side magnetic flux inducing portions are each arranged alternately one by one in the axial direction.

4. The rotor according to claim 3, wherein the one-side magnetic flux inducing portions and the other-side magnetic flux inducing portions are fixed together directly, or indirectly via a connecting pin, wherein the one-side magnetic flux inducing portions and the other-side magnetic flux inducing portions are arranged alternately via a gap in the axial direction.

5. The rotor according to claim 4, at least a portion of the rotor coil that is wound around the teeth having the one-side magnetic flux inducing portions is arranged radially inward of the one-side magnetic flux inducing portions.

6. The rotor according to claim 3, wherein the one-side magnetic flux inducing portions and the other-side magnetic flux inducing portions are stacked together alternately in the axial direction.

7. The rotor according to claim 3, wherein the one-side magnetic flux inducing portions and the other-side magnetic flux inducing portions are connected together via a connecting pin.

8. The rotor according to claim 1, wherein the plurality of plate members includes two-armed steel plates that each have a first trunk portion and a protruding portion that protrudes from both sides in a width direction of the first trunk portion, and armless steel plates that each have a second trunk portion;

the teeth having the magnetic flux inducing section is formed by a stacked body that includes the two-armed steel plates and the armless steel plates; and the protruding portions of the two-armed steel plates form the magnetic flux inducing sections.

9. The rotor according to claim 1, wherein the plurality of plate members includes one-armed steel plates that each have a first trunk portion and a protruding portion that protrudes from one side in a width direction of the first trunk portion, and armless steel plates that each have a second trunk portion;

the teeth having the magnetic flux inducing section is formed by a stacked body that includes the one-armed steel plates and the armless steel plates; and the protruding portions of the one-armed steel plates form the magnetic flux inducing sections.

10. The rotor according to claim 1, wherein the magnetic flux inducing section is formed by magnetic flux inducing plate portions being stacked together, the magnetic flux inducing plate portions are provided on a portion of the plurality of plate members that form the corresponding teeth.

11. A rotor for a rotary electric machine, comprising:

a plurality of teeth, each of which is formed by a plurality of plate members including steel plates that are stacked together, and around which a rotor coil is wound, the plurality of teeth extending in a radial direction, at least a portion of the plurality of teeth including i) a one-side magnetic flux inducing portion that is positioned between two of the teeth that are adjacent to one another, and that protrudes from at least one of the two teeth that are adjacent to one another, and that is formed on at least a portion of a plurality of plate members that form one of the teeth, and ii) an other-side magnetic flux inducing portion that is positioned between the two teeth that are adjacent to one another, and that protrudes from the other of the two teeth that are adjacent to one another, and that is formed on at least a portion of a plurality of plate members that form the other of the teeth; the one-side magnetic flux inducing portion being formed by a stacked portion of a plurality of first magnetic flux inductive plate portions that protrude from the portion of plate members that forms a plurality of locations in an axial direction of one of the teeth, and a second magnetic flux inductive plate portion that is shorter than the first magnetic flux inductive plate portion and that protrudes from another of the plate members that forms a plurality of locations in the axial direction of one of the teeth; the other-side magnetic flux inducing portion being formed by a stacked portion of a plurality of third magnetic flux inductive plate portions that protrude from a portion of plate members that forms a plurality of locations in the axial direction of the other of the teeth, and a fourth magnetic flux inductive plate portion that is shorter than the third magnetic flux inductive plate portion and that protrudes from another of the plate members that forms a plurality of locations in the axial direction of the other of the teeth; and the first magnetic flux inductive plate portions and the third magnetic flux inductive plate portions being arranged offset in the axial direction and facing one another.

12. A rotor for a rotary electric machine, comprising:

a plurality of teeth, each of which is formed by a plurality of plate members including steel plates that are stacked together, and around each of the plurality of teeth a rotor coil is wound, the plurality of teeth extending in a radial direction, the plurality of plate members includes two-armed steel plates and armless steel plates, the two-armed steel plates having a first trunk portion and a protruding portion that protrudes from both sides in a width direction of the first trunk portion, and the armless steel plates having a second trunk portion, at least a portion of the plurality of teeth including a magnetic flux inducing section, the magnetic flux inducing section being formed by the protruding portions of the two-armed steel plates protruding between two of the teeth that are adjacent to one another, from at least a portion of the plurality of plate members that form at least one of the two teeth that are adjacent to one another, wherein the teeth having the magnetic flux inducing section is formed by a stacked body that includes the two-armed steel plates and the armless steel plates.

* * * * *